United States Patent
Onishi et al.

(10) Patent No.: US 12,473,388 B2
(45) Date of Patent: Nov. 18, 2025

(54) ACRYLIC POLYMER

(71) Applicant: Nippon Shokubai Co., Ltd., Osaka (JP)

(72) Inventors: Ryuji Onishi, Osaka (JP); Teruhiro Kawano, Osaka (JP); Shingo Tokuhara, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 929 days.

(21) Appl. No.: 17/291,685

(22) PCT Filed: Nov. 6, 2019

(86) PCT No.: PCT/JP2019/043437
§ 371 (c)(1),
(2) Date: May 6, 2021

(87) PCT Pub. No.: WO2020/095933
PCT Pub. Date: May 14, 2020

(65) Prior Publication Data
US 2022/0002457 A1    Jan. 6, 2022

(30) Foreign Application Priority Data

Nov. 6, 2018 (JP) ................................ 2018-209210
Dec. 20, 2018 (JP) ................................ 2018-238098
Aug. 1, 2019 (JP) ................................ 2019-142311

(51) Int. Cl.
G02B 27/01 (2006.01)
B29C 45/00 (2006.01)
C08F 220/14 (2006.01)
B29K 33/00 (2006.01)

(52) U.S. Cl.
CPC ........ C08F 220/14 (2013.01); B29C 45/0001 (2013.01); G02B 27/01 (2013.01); *B29K 2033/12* (2013.01)

(58) Field of Classification Search
CPC .. C08F 220/14; C08F 8/16; C08F 8/48; B29C 45/0001; G02B 27/01; B29K 2033/12; C08K 5/0041; C08K 5/005; F21S 43/235
See application file for complete search history.

(56) References Cited

U.S. PATENT DOCUMENTS

| 2003/0004278 | A1 |   | 1/2003  | Asano et al. |
|---|---|---|---|---|
| 2003/0134988 | A1 | * | 7/2003  | Asano ................ C08F 8/16 |
|   |   |   |   | 428/501 |
| 2007/0037962 | A1 |   | 2/2007  | Ueda et al. |
| 2017/0362368 | A1 | * | 12/2017 | Kitayama ............ C08L 51/00 |
| 2018/0258272 | A1 |   | 9/2018  | Matsumoto et al. |

FOREIGN PATENT DOCUMENTS

| JP | 2000230016  | A  | * | 8/2000 | ............ C08F 8/16 |
|---|---|---|---|---|---|
| JP | 2007-058047 | A  |   | 3/2007 | |
| JP | 2007058047  |    | * | 3/2007 | |
| JP | 2007070607  | A  | * | 3/2007 | ............ C07C 67/50 |
| JP | 2007154072  | A  | * | 6/2007 | |
| JP | 2011006647  | A  | * | 1/2011 | ............ C08F 285/00 |
| JP | 2015-078063 | A  |   | 4/2015 | |
| JP | 2012078063  |    | * | 4/2015 | |
| WO | 2017/022393 | A1 |   | 2/2017 | |

OTHER PUBLICATIONS

International Preliminary Report on Patentability issued in corresponding International Patent Application No. PCT/JP2019/043437 dated May 11, 2021.
Extended European Search Report issued in corresponding European Patent Application No. 19881616.7 dated Jul. 11, 2022.
International Search Report issued in corresponding International Patent Application No. PCT/JP2019/043437 dated Jan. 7, 2020.

* cited by examiner

*Primary Examiner* — Kumar R Bhushan
(74) *Attorney, Agent, or Firm* — Morgan, Lewis & Bockius LLP

(57) ABSTRACT

A novel acrylic polymer is provided. The novel acrylic polymer is an acrylic polymer which has a lactone ring structure in the main chain and has a melt flow rate of 2 g/10 minutes or more as measured at 230° C. under a load of 3.8 kg according to JIS K 7210.

17 Claims, No Drawings

ACRYLIC POLYMER

TECHNICAL FIELD

The present invention relates to a novel acrylic polymer and the like.

BACKGROUND ART

In recent years, in Europe, North America, and other regions, always-on daytime running lights have been increasingly installed in the headlamps and rear lamps of automobiles to increase visibility to pedestrians and oncoming traffic during the daytime, and such efforts have been promoted. Daytime running lights generally have alight guide and alight source that directs light into the light guide.

Automobiles are equipped with incandescent lamps such as halogen lamps and LEDs as regular nighttime light sources in the vicinity of daytime running lights, and this means that light guides in automobiles are heated by the heat generated by the incandescent lamps in addition to the heat generated by the daytime running light sources. Therefore, such light guides require excellent heat resistance.

Such heat resistance is required for not only light guides, but also other optical members located close to light sources installed in automobiles.

Acrylic polymers, such as polymethyl methacrylate (PMMA), are used as optical materials due to their high transparency etc.

In addition, acrylic polymers with a ring structure in the main chain are under development for improving heat resistance etc. For example, Patent Literature 1 discloses a copolymer having a methyl (meth)acrylate unit, a methacrylic acid unit, and a glutaric anhydride unit.

CITATION LIST

Patent Literature

Patent Literature 1: WO 2017/022393

SUMMARY OF INVENTION

Technical Problem

An object of the present invention is to provide a novel acrylic polymer and the like.

Solution to Problem

As mentioned above, attempts are being made to introduce a ring structure into acrylic polymers for improving heat resistance etc. Such acrylic polymers often have relatively low flowability (melt flowability), probably due to the presence of the ring structure, and according to a study from the present inventors, some of the acrylic polymers are not suitable for use in molding light guides etc., probably because light guides are large (with a long optical path) and have complex shapes.

In addition, such acrylic polymers have a tendency to discolor (turn yellow) during the preparation and molding of compositions, probably due to the presence of the ring structure.

In particular, this tendency become more pronounced as the proportion of the ring structure introduced is increased for further improving heat resistance etc. For this reason, some of these acrylic polymers are not suitable for particular applications, for example, applications that require a high level of heat resistance [and also moldability and processability (melt flowability)] (e.g., lens members of head-up displays or in-vehicle cameras).

The present inventors found that such discoloration can be suppressed to a certain extent by reducing the UV absorber content, but it has been extremely difficult to find a formulation (method) that can suppress yellowing to a greater extent, suppress yellowing without compromising transparency, or achieve such yellowing suppression together with excellent melt formability.

Under these circumstances, the present inventors have found that by using an acrylic polymer having a lactone ring structure in the main chain and a specific melt flow rate, it is feasible to efficiently mold even light guides, and that by combining an acrylic polymer having such a ring structure with specific additives, it is feasible to efficiently suppress discoloration, surprisingly even when the proportion of the ring structure in the acrylic polymer is increased. Also, the present inventors have found that both transparency and discoloration (yellowing) resistance can be achieved together with excellent melt moldability. Based on these findings, the present inventors have completed the present invention.

That is, the present invention relates to the following.

[1] An acrylic polymer having a lactone ring structure in the main chain, the acrylic polymer having a melt flow rate of 2 g/10 minutes or more as measured at 230° C. under a load of 3.8 kg according to JIS K 7210 (e.g., JIS K 7210-1: 2014 Method A).

[2] The acrylic polymer according to the above [1], wherein the acrylic polymer has a weight-average molecular weight of 50,000 to 100,000.

[3] The acrylic polymer according to the above [1], wherein the acrylic polymer has a weight-average molecular weight of 50,000 to 95,000.

[4] The acrylic polymer according to any one of the above [1] to [3], wherein the acrylic polymer has a glass transition temperature of 110° C. or higher.

[5] The acrylic polymer according to any one of the above [1] to [4], wherein the acrylic polymer has a yellowness index of 2 or less.

[6] The acrylic polymer according to any one of the above [1] to [5], wherein the acrylic polymer has a total light transmittance of 92% or more.

[7] The acrylic polymer according to any one of the above [1] to [6], wherein the acrylic polymer has a molecular weight distribution (Mw/Mn) of 2.2 or less.

[8] The acrylic polymer according to any one of the above [1] to [7], wherein the acrylic polymer is used for injection molding.

[9] A molded body (or composition) comprising the acrylic polymer according to any one of the above [1] to [8] (and [13] to [15] below).

[10] The molded body (or composition) according to the above [9], wherein the molded body is a light guiding member or a lens member.

[11] The molded body (or composition) according to the above [9] or [10], wherein the molded body is a light guide for a vehicle lamp, a lens member of a head-up display, or a lens member of an in-vehicle camera.

[12] A method for producing the acrylic polymer according to any one of the above [1] to [8], the method comprising the step of polymerizing polymerizable components by divided addition or dropwise addition of monomers.

[13] The acrylic polymer according to any one of the above [1] to [8], wherein the proportion of the ring structure (lactone ring structure) is 20% by mass or more (e.g., 25% by mass or more).

[14] The acrylic polymer according to any one of the above [1] to [8] and [13], wherein the acrylic polymer has a glass transition temperature of 125° C. or higher.

[15] The acrylic polymer according to any one of the above [1] to [8], [13], and [14], wherein the absolute value of the stress optical coefficient (Cr) is $15 \times 10^{-11}$ $Pa^{-1}$ or less.

[16] The molded body (or composition) according to any one of the above [9] to [11], comprising a colorant.

[17] The molded body (or composition) according to the above [16], wherein the colorant has a maximum absorbance at a wavelength of 520 to 600 nm.

[18] The molded body (or composition) according to the above [16] or [17], wherein the colorant includes a compound having an anthraquinone skeleton.

[19] The molded body (or composition) according to any one of the above [9] to [11] and [16] to [18], wherein the proportion of the ring structure (lactone ring structure) in the acrylic polymer is 20% by mass or more (e.g., 25% by mass or more), and wherein the molded body (or composition) comprises a colorant (e.g., colorant having a maximum absorbance at a wavelength of 520 to 600 nm, a compound (colorant) having an anthraquinone skeleton).

[20] The molded body (or composition) according to any one of the above [16] to [19], wherein the proportion of the colorant is 800 mass ppb or less.

[21] The molding body (or composition) according to any one of the above [16] to [20], wherein the proportion of the ring structure (lactone ring structure) in the acrylic polymer is 20% by mass or more (e.g., 25% by mass or more), wherein the acrylic polymer has a glass transition temperature of 125° C. or higher (e.g., 128° C. or higher), and wherein the proportion of the colorant is 800 mass ppb or less (e.g., 400 mass ppb or less).

[22] The molded body (or composition) according to any one of the above [16] to [21], wherein the molded body (or composition) comprises an ultraviolet absorber, and wherein the proportion of the ultraviolet absorber is 0.5% by mass or less.

[23] The molded body according to any one of the above [9] to [11] and [16] to [22], wherein the molded body has a yellowness index of 2 or less.

[24] The molded body according to any one of the above [9] to [11] and [16] to [23], wherein the molded body has a total light transmittance of 92% or more.

[25] The molded body according to any one of the above [9] to [11] and [16] to [24], wherein the molded body is an injection molded body.

Advantageous Effects of Invention

The present invention provides a novel acrylic polymer.

The acrylic polymer of the present invention has excellent melt flowability. Therefore, such an acrylic polymer can be used to efficiently produce molded bodies (injection molded bodies such as light guides).

In addition, the acrylic polymer is less likely to discolor during molding (in particular, injection molding) due to its excellent melt flowability. Therefore, such a polymer can be used to produce molded bodies with a low yellowness index (injection molded bodies such as light guides).

Moreover, such an acrylic polymer is excellent in heat resistance and moisture heat resistance. Furthermore, the present invention provides an acrylic polymer with excellent durability. Therefore, even after the acrylic polymer of the present invention is exposed to, for example, a high temperature environment or a high temperature and high humidity environment for a prolonged period of time, light transmittance reduction and yellowing are less likely to occur.

In another aspect of the present invention, discoloration can be efficiently suppressed even when the proportion of the ring structure in the acrylic polymer is increased, for example, by 20% by mass or more.

Therefore, according to the present invention, acrylic polymers (compositions) with low discoloration and high heat resistance (e.g., glass transition temperature of 125° C. or higher) can be efficiently obtained.

In another aspect of the invention, excellent transparency and low discoloration are both achievable without compromising transparency.

Therefore, the composition of the present invention is suitable for applications that require such properties, for example, as a composition (resin composition) for constituting a lens member (e.g., a lens member of a head-up display or in-vehicle camera).

DESCRIPTION OF EMBODIMENTS

Acrylic Polymer

The acrylic polymer has a lactone ring structure in the main chain. Such an acrylic polymer is usually thermoplastic polymer. In addition, the acrylic polymer usually has a melt flow rate that is within the specific range described below. The production method of such an acrylic polymer is not particularly limited, and the acrylic polymer may be produced by any of the methods described below.

The acrylic polymer (sometimes referred to as acrylic polymer (A1)) may usually have a (meth)acrylic acid ester unit [(meth)acrylic acid ester-derived unit (structural unit)].

The (meth)acrylic acid ester that constitutes the (meth) acrylic acid ester unit is not particularly limited, and examples include aliphatic (meth)acrylates [e.g., (meth)acrylic acid alkyl esters (e.g., $C_{1-18}$ alkyl (meth)acrylates such as methyl (meth)acrylate, ethyl (meth)acrylate, and butyl (meth)acrylate) etc.], alicyclic (meth)acrylates [e.g., (meth)acrylic acid cycloalkyl esters (e.g., $C_{3-20}$ cycloalkyl (meth)acrylates such as cyclopropyl (meth)acrylate and cyclobutyl (meth)acrylate), bridged cyclic (meth)acrylates (e.g., isobornyl (meth)acrylate), etc.], and aromatic (meth) acrylates [e.g., (meth)acrylic acid aryl esters (e.g., $C_{6-20}$ aryl (meth)acrylates such as phenyl (meth)acrylate and o-tolyl (meth)acrylate), (meth)acrylic acid aralkyl esters (e.g., $C_{6-10}$ aryl $C_{1-4}$ alkyl (meth)acrylates such as benzyl (meth)acrylate), (meth)acrylic acid phenoxyalkyl esters (e.g., phenoxy $C_{1-4}$ alkyl (meth)acrylates such as phenoxyethyl (meth)acrylate), etc.].

The (meth)acrylic acid ester includes a (meth)acrylic acid ester having a substituent (e.g., a hydroxyl group, an alkoxy group, a glycidyl group, etc.). Examples of such a (meth) acrylic acid ester include methacrylic acid esters having a hydroxyl group [e.g., (meth)acrylic acid hydroxyalkyl esters (e.g., hydroxy $C_{1-12}$ alkyl (meth)acrylates such as 2-hydroxyethyl (meth)acrylate) etc.], (meth)acrylic acid esters having an alkoxy group [e.g., (meth)acrylic acid alkoxyalkyl esters (e.g., $C_{1-12}$ alkoxy $C_{1-12}$ alkyl methacrylates such as 2-methoxyethyl (meth)acrylate) etc.], and (meth)acrylic acid esters having a glycidyl group (e.g., glycidyl (meth)acrylate etc.).

One kind of (meth)acrylic acid ester or a combination of two or more kinds of (meth)acrylic acid esters may constitute the (meth)acrylic acid ester unit.

The (meth)acrylic acid ester units preferably at least include a methacrylic acid ester unit although it depends on the desired physical properties.

Examples of the methacrylic acid ester that constitutes the (meth)acrylic acid ester unit include aliphatic methacrylates [e.g., methacrylic acid alkyl esters (e.g., $C_{1-18}$ alkyl methacrylates such as methyl methacrylate, ethyl methacrylate, n-propyl methacrylate, isopropyl methacrylate, n-butyl methacrylate, isobutyl methacrylate, sec-butyl methacrylate, tert-butyl methacrylate, pentyl methacrylate, amyl methacrylate, isoamyl methacrylate, n-hexyl methacrylate, 2-ethylhexyl methacrylate, heptyl methacrylate, octyl methacrylate, decyl methacrylate, dodecyl methacrylate, pentadecyl methacrylate, hexadecyl methacrylate, heptadecyl methacrylate, and octadecyl methacrylate, preferably $C_{1-12}$ alkyl methacrylates) etc.], alicyclic methacrylates [e.g., methacrylic acid cycloalkyl esters (e.g., $C_{3-20}$ cycloalkyl methacrylates such as cyclopropyl methacrylate, cyclobutyl methacrylate, cyclopentyl methacrylate, and cyclohexyl methacrylate, preferably $C_{3-12}$ cycloalkyl methacrylates), bridged cyclic methacrylates (e.g., isobornyl methacrylate etc.), etc.], and aromatic methacrylates [e.g., methacrylic acid aryl esters (e.g., $C_{6-20}$ aryl methacrylates such as phenyl methacrylate, o-tolyl methacrylate, m-tolyl methacrylate, p-tolyl methacrylate, 2,3-xylyl methacrylate, 2,4-xylyl methacrylate, 2,5-xylyl methacrylate, 2,6-xylyl methacrylate, 3,4-xylyl methacrylate, 3,5-xylyl methacrylate, 1-naphthyl methacrylate, 2-naphthyl methacrylate, binaphthyl methacrylate, and anthryl methacrylate, preferably $C_{6-10}$ aryl methacrylates), methacrylic acid aralkyl esters (e.g., $C_{6-10}$ aryl $C_{1-4}$ alkyl methacrylates such as benzyl methacrylate), phenoxyalkyl methacrylates (e.g., phenoxy $C_{1-4}$ alkyl methacrylates such as phenoxyethyl methacrylate), etc.].

The (meth)acrylic acid ester units preferably at least include a methacrylic acid alkyl ester unit (e.g., a $C_{1-18}$ alkyl methacrylate unit) and particularly preferably at least include a methyl methacrylate unit in order to improve transparency etc.

The acrylic polymer may comprise a polymerizable monomer unit other than the (meth)acrylic acid ester units, if necessary. Examples of such an additional monomer include acid group-containing monomers (methacrylic acid, acrylic acid, etc.), styrene-based monomers [e.g., styrene, vinyltoluene, styrenes having a substituent (e.g., a halogen group, an alkoxy group, an alkyl group, a hydroxy group, etc.) (e.g., α-methylstyrene, chlorostyrene, etc.), styrene sulfonic acid or its salt, etc.], vinyl esters (e.g., vinyl acetate etc.), unsaturated nitriles (e.g., acrylonitrile, methacrylonitrile, etc.), olefin monomers (e.g., $C_{2-10}$ alkenes such as ethylene, propylene, 1-butene, isobutylene, and 1-octene), amide group-containing vinyl monomers [e.g., (meth)acrylamide, N-substituted (meth)acrylamides (e.g., N-alkyl (meth)acrylamides such as N-methyl (meth)acrylamide; N-cycloalkyl (meth)acrylamides such as N-cyclohexyl (meth)acrylamide; N-aryl (meth)acrylamides such as N-phenyl (meth)acrylamide; and N-aralkyl (meth)acrylamides such as N-benzyl (meth)acrylamide), etc.], and 2-(hydroxymethyl)acrylic acid esters (e.g., alkyl esters such as ethyl 2-(hydroxymethyl)acrylate).

One kind of additional monomer or a combination of two or more kinds of additional monomers may constitute the additional monomer unit.

As the additional polymerizable monomer unit, a styrene-based monomer unit (structural unit) is preferred, and a styrene monomer unit is more preferred. Therefore, the additional polymerizable monomer units preferably at least include a styrene-based (in particular, styrene) monomer unit.

The proportion of the (meth)acrylic acid ester unit in the acrylic polymer (or in the structural units of the acrylic polymer) can be, for example, 10% by mass or more (e.g., 20% by mass or more), preferably 30% by mass or more (e.g., 40% by mass or more), more preferably 50% by mass or more (e.g., 55% by mass or more), or may be 60% by mass or more, 70% by mass or more, or the like.

When the acrylic polymer comprises a methacrylic acid ester unit, the proportion of the methacrylic acid ester unit in the acrylic polymer (or in the structural units of the acrylic polymer) can be, for example, 10% by mass or more, 20% by mass or more, preferably 30% by mass or more (e.g., 40% by mass or more), more preferably 50% by mass or more (e.g., 55% by mass or more), or may be 60% by mass or more, 70% by mass or more, or the like.

When the acrylic polymer comprises a methacrylic acid ester unit, the proportion of the methacrylic acid ester unit in the (meth)acrylic acid ester units is, for example, 10% by mass or more (e.g., 20% by mass or more), preferably 30% by mass or more (e.g., 40% by mass or more), more preferably 50% by mass or more (e.g., 60% by mass or more), or may be 70% by mass or more, 80% by mass or more, 90% by mass or more, or the like.

When the acrylic polymer comprises a methacrylic acid alkyl ester unit, the proportion of the methacrylic acid alkyl ester unit in the (meth)acrylic acid ester units is, for example, 10% by mass or more (e.g., 20% by mass or more), preferably 30% by mass or more (e.g., 40% by mass or more), more preferably 50% by mass or more (e.g., 60% by mass or more), or may be 70% by mass or more, 80% by mass or more, 90% by mass or more, or the like.

When the acrylic polymer comprises a methyl methacrylate unit, the proportion of the methyl methacrylate unit in the (meth)acrylic acid ester units is, for example, 10% by mass or more (e.g., 20% by mass or more), preferably 30% by mass or more (e.g., 40% by mass or more), more preferably 50% by mass or more (e.g., 60% by mass or more), or may be 70% by mass or more, 80% by mass or more, 90% by mass or more, or the like.

When the acrylic polymer comprises a benzyl (meth) acrylate unit, the proportion of the benzyl (meth)acrylate unit in the acrylic polymer may be relatively low from the viewpoint of discoloration resistance and is, for example, 10% by mass or less (e.g., 5% by mass or less), preferably 2% by mass or less (e.g., 1% by mass or less), more preferably 0.5% by mass or less or the like.

When the acrylic polymer comprises an acrylic acid ester unit, the proportion of the acrylic acid ester unit in the acrylic polymer may be relatively low from the viewpoint of heat resistance and refractive index and can be, for example, less than 10% by mass (e.g., 8% by mass or less), preferably 5% by mass or less (e.g., 4% by mass or less), more preferably 3% by mass or less (e.g., 2% by mass or less).

When the acrylic polymer comprises the additional polymerizable monomer unit, the proportion of such a unit in the acrylic polymer is not limited and can be selected as appropriate. In particular, when the additional polymerizable monomer is an acid group-containing monomer, the proportion of the acid group-containing monomer unit may be relatively low from the viewpoint of transparency, discoloration, etc. and is, for example, 10% by mass or less (e.g., 5% by mass or less), preferably 2% by mass or less (e.g., 1% by mass or less), more preferably 0.5% by mass or less or the like.

When the acrylic polymer comprises a styrene-based monomer unit (structural unit) as the additional polymerizable monomer unit, the proportion of the styrene-based monomer unit can be 20% by mass or less (e.g., 15% by mass), preferably 10% by mass or less, more preferably 7% by mass or less.

The lower limit of the proportion of the additional monomer (e.g., styrene-based monomer) unit (structural unit) is not particularly specified, and the proportion can be, for example, 0.5% by mass or more.

When the proportion of the additional monomer structural unit is in the range as described above, it is easy to efficiently obtain an acrylic resin (acrylic polymer) having, for example, a highly controlled birefringence and excellent weather resistance, although it depends on the type of additional monomer (e.g., styrene-based monomer).

The acrylic polymer has a lactone ring structure. This lactone ring structure is usually located in the main chain of the acrylic resin (the polymer chain, the acrylic polymer).

Whether or not a lactone ring is present in the backbone of the acrylic polymer (resin) or whether or not the main chain has a lactone ring structure can be confirmed by, for example, infrared absorption spectroscopy and $^{13}$C-NMR.

The presence of the lactone ring structure in the acrylic polymer can provide, improve, or enhance various properties of the acrylic polymer, such as heat resistance, moisture heat resistance, yellowing resistance, hardness (strength), solvent resistance, surface hardness, oxygen and water vapor barrier properties, optical properties, dimensional stability, and shape stability.

In addition, the presence of the lactone ring structure in the acrylic polymer makes it feasible to efficiently produce molded bodies with a thinner film thickness (e.g., lenses) as compared to those made from polymethyl methacrylate etc.

The lactone ring structure is not particularly limited and may be, for example, a 4- to 8-membered ring. Preferred is a 5-membered or 6-membered ring due to the excellent stability of the ring structure, and more preferred is a 6-membered ring.

The lactone ring structure may be, for example, the structure disclosed in JP 2004-168882 or the structure represented by the following formula (1).

[Chem. 1]

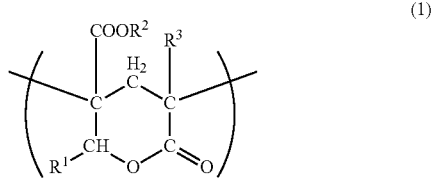

(1)

(In the formula, $R^1$, $R^2$, and $R^3$ are each independently a hydrogen atom or a substituent.)

In formula (1), examples of the substituent include organic residues such as hydrocarbon groups.

Examples of the hydrocarbon group include aliphatic groups (e.g., $C_{1-20}$ alkyl groups such as a methyl group, an ethyl group, and a propyl group, $C_{2-20}$ unsaturated aliphatic hydrocarbon groups such as an ethenyl group and a propenyl group, etc.) and aromatic groups (e.g., $C_{6-20}$ aromatic hydrocarbon groups such as a phenyl group and a naphthyl group).

The hydrocarbon group may contain an oxygen atom, and one or more of the hydrogen atoms in the hydrocarbon group may be substituted by at least one group selected from a hydroxyl group, a carboxyl group, an ether group, and an ester group.

In formula (1), preferably, $R^3$ is a hydrogen atom or a methyl group, and $R^1$ and $R^2$ are each independently a hydrogen atom or a $C_{1-20}$ alkyl group; and more preferably, $R^3$ is a hydrogen atom or a methyl group, and $R^1$ and $R^2$ are each independently a hydrogen atom or a methyl group.

The lactone ring structure may contain one or more kinds of structures represented by formula (1).

The acrylic polymer may have a ring structure other than the lactone ring structure (additional ring structure).

Examples of the additional ring structure include cyclic imide structures (e.g., N-substituted maleimide monomer-derived structures, a glutarimide structure, etc.), cyclic amide structures (e.g., lactam structures etc.), and acid anhydride structures (e.g., maleic anhydride monomer-derived structures, a glutaric anhydride structure). The additional ring structure is not particularly limited and may be any of the structures disclosed in known publications (e.g., the glutarimide structure disclosed in JP 2006-309033, the glutaric anhydride structure disclosed in JP 2006-283013, etc.).

The acrylic polymer may have one or more kinds of additional ring structures.

The proportion of the lactone ring structure can be selected according to the application, desired properties, etc. and is not particularly limited. For example, the proportion of the lactone ring structure in the acrylic polymer can be about 0.1% by mass or more (e.g., 0.5% by mass or more), for example, 1% by mass or more, preferably 3% by mass or more, more preferably 5% by mass or more, or may be 10% by mass or more, 15% by mass or more, 20% by mass or more, or the like.

The proportion (or the upper limit) of the lactone ring structure in the acrylic polymer is not particularly limited and may be, for example, 90% by mass or less, 80% by mass or less, 70% by mass or less, 60% by mass or less, 55% by mass or less, 50% by mass or less, 45% by mass or less, 40% by mass or less, 35% by mass or less, or the like.

A higher proportion of the lactone ring structure is preferable in terms of heat resistance, hardness (strength), solvent resistance, surface hardness, dimensional stability, etc.

These upper and lower limits may be combined to set an appropriate range (e.g., 1 to 70% by mass, 3 to 60% by mass, 5 to 60% by mass, 5 to 50% by mass, etc.) (the same applies to the others).

In particular, the proportion of the lactone ring structure may be, for example, 1 to 80% by mass, preferably 3 to 70% by mass, more preferably 5 to 60% by mass (e.g., 10 to 50% by mass), or may be relatively high, for example, 10% by mass or more [e.g., 13 to 60% by mass, 15% by mass or more (e.g., 18 to 55% by mass), 20% by mass or more (e.g., 23 to 50% by mass)].

When the proportion of the lactone ring structure introduced into the acrylic polymer is relatively high, it is easy to efficiently obtain an acrylic polymer having very good heat resistance (e.g., high glass transition temperature) and moisture heat resistance.

The proportion of the ring structure in the acrylic polymer can be measured using a conventional method appropriate for the type of ring structure, etc. For example, the proportion of the lactone ring structure can be measured based on a de-alcoholization reaction rate (e.g., by the method described later).

The acrylic polymer may have an atom or group derived from the components used in polymerization, etc.

For example, the acrylic polymer may contain a sulfur atom. In a more specific embodiment, a sulfur-containing group (sulfur-containing skeleton) may be present at least at a molecular end.

For the production of such an acrylic polymer having a sulfur atom or sulfur-containing group, for example, a thiol compound (e.g., the thiol compound described later) can be used as a chain transfer agent.

When the acrylic polymer is a copolymer, the form of the copolymer is not particularly limited and may be, for example, a random copolymer, a block copolymer, an alternating copolymer, or a graft copolymer.

The acrylic polymer having a lactone ring structure can usually be said to be a copolymer due to the presence of the lactone ring structure. The pattern in which the lactone ring structure is introduced is not limited and may be, for example, a random, block, alternating, or graft pattern.

The acrylic polymer may have relatively high flowability (melt flowability).

The melt flow rate of the acrylic polymer as measured at a temperature of 230° C. under a load of 3.8 kg may be, for example, 1 g/10 minutes or more (e.g., 1.2 g/10 minutes or more, 1.5 g/10 minutes or more, 1.8 g/10 minutes or more), 2 g/10 minutes or more (e.g., 2.1 g/10 minutes or more), preferably 2.2 g/10 min or more, or may be 2.5 g/10 minutes or more (e.g., 2.8 g/10 minutes or more, 3 g/10 minutes or more, 3.2 g/10 minutes or more, 3.5 g/10 minutes or more, 3.7 g/10 minutes or more, 3.8 g/10 minutes or more, 3.9 g/10 minutes or more, 4 g/10 minutes or more, etc.).

Generally, acrylic polymers having a ring structure often have relatively low melt flowability. However, the acrylic polymer of the present invention has relatively high melt flowability despite the presence of the ring structure.

Due to its excellent melt flowability (high melt flowability), discoloration during molding (in particular, injection molding) is less likely to occur, and molded bodies (injection molded bodies such as light guides and optical lenses) having a low yellowness index can be efficiently obtained.

The high melt flowability enables molding at lower temperatures, which can reduce thermal history during the molding process, suppressing discoloration of molded products, and can also reduce the time required for the heat-up and heat-down processes in the injection equipment, leading to higher productivity.

The upper limit of the melt flow rate of the acrylic polymer (or a composition thereof, the same applies hereinafter) as measured at a temperature of 230° C. under a load of 3.8 kg may be, for example, 10 g/10 minutes or less, 9.8 g/10 minutes or less, 9.6 g/10 minutes or less, 9.4 g/10 minutes or less, 9.2 g/10 minutes or less, 9 g/10 minutes or less, 8.8 g/10 minutes or less, 8.6 g/10 minutes or less, 8.4 g/10 minutes or less, 8.2 g/10 minutes or less, 8 g/10 minutes or less, 7.8 g/10 minutes or less, 7.6 g/10 minutes or less, 7.4 g/10 minutes or less, 7.2 g/10 minutes or less, 7 g/10 minutes or less, or the like.

The specific range of the melt flow rate of the acrylic polymer as measured at a temperature of 230° C. and under a load of 3.8 kg may be, for example, 1 g/10 minutes to 10 g/10 minutes or 2 g/10 minutes to 10 g/10 minutes, preferably 2 g/10 minutes to 9 g/10 minutes (e.g., 2 g/10 minutes to 8 g/10 minutes) or the like for excellent moldability of the acrylic polymer.

The melt flow rate of the acrylic polymer may be measured according to JIS K 7210 (JIS K 7210-1: 2014 Method A).

The weight-average molecular weight (Mw) of the acrylic polymer may be 5,000 or more (e.g., 7,000 or more), for example, 10,000 or more (e.g., 12,000 or more), preferably 15,000 or more (e.g., 18,000 or more), more preferably 20,000 or more (e.g., 25,000 or more), or may be 30,000 or more (e.g., 35,000 or more, 38,000 or more, 40,000 or more, 42,000 or more, 45,000 or more, 48,000 or more, 50,000 or more, 52,000 or more, 55,000 or more, 58,000 or more, 60,000 or more, 62,000 or more, 65,000 or more, etc.).

The upper limit of the weight-average molecular weight (Mw) of the acrylic polymer may be, for example, 100,000, 98,000, 95,000, 92,000, 90,000, 88,000, or the like.

In particular, the weight-average molecular weight (Mw) of the acrylic polymer may be relatively low, for example, 150,000 or less, 120,000 or less, 100,000 or less, 95,000 or less, or the like.

The specific range of the weight-average molecular weight (Mw) of the acrylic polymer may be, for example, 50,000 to 100,000, preferably 50,000 to 95,000 (e.g., 50,000 to 93,000) or the like for excellent moldability of the acrylic polymer.

The acrylic polymer may have a relatively narrow molecular weight distribution (Mw/Mn) from the viewpoint of melt flowability and strength of the molded body.

The molecular weight distribution (Mw/Mn) of the acrylic polymer may be, for example, about 1 to 10 (e.g., 1.1 to 7.0), preferably about 1.2 to 5.0 (e.g., 1.5 to 4.0), may be about 1.5 to 3.0, or may be 2.4 or less, 2.35 or less, 2.3 or less, 2.25 or less, 2.2 or less, 2.1 or less, or the like.

The molecular weight (and molecular weight distribution) may be measured, for example, by GPC in terms of polystyrene.

The glass transition temperature (Tg) of the acrylic polymer is not particularly limited and may be, for example, about 70° C. or higher (e.g., 80 to 200° C.), preferably about 90° C. or higher (e.g., 100 to 180° C.), more preferably about 110° C. or higher (e.g., 115 to 160° C.). It may be about 120° C. or higher (e.g., 120 to 150° C.) or may be 122° C. or higher [e.g., 123 to 160° C., 125° C. or higher (e.g., 126 to 155° C.), 128° C. or higher (e.g., 129 to 150° C.), 130° C. or higher (e.g., 131 to 148° C.), 132° C. or higher (e.g., 132 to 145° C., 134 to 142° C., 135 to 150° C.)] or the like.

The glass transition temperature (Tg) can be adjusted by changing, for example, the proportion of the lactone ring structure introduced into the acrylic polymer.

The acrylic polymer of the present invention has such a relatively high glass transition temperature (heat resistance), yet it has high transparency, low discoloration, and excellent durability.

The Tg may be measured, for example, by the method described later.

The acrylic polymer has a lactone ring structure and often has a relatively high glass transition temperature.

The acrylic polymer may have a relatively low yellowness index (YI).

The yellowness index of the acrylic polymer may be, for example, 2 or less, preferably 1.7 or less, more preferably 1.5 or less, or may be 1.4 or less, 1.3 or less, 1.2 or less, 1.1 or less, 1.0 or less, 0.9 or less, 0.8 or less, 0.7 or less, 0.6 or less, 0.5 or less, or the like.

The lower limit of the yellowness index may be 0 (or the limit of detection) or a finite value (e.g., 0.01, 0.02, 0.05, 0.1, 0.15, 0.2, 0.25, 0.3, 0.35, etc.).

These upper and lower limits may be combined to set an appropriate range (e.g., 0.01 to 2.0, 0.05 to 1.7, 0.1 to 1.5, 0.1 to 1.3, etc.) for the yellowness index of the acrylic polymer (the same applies to the others).

The yellowness index may be measured, for example, as a value at a thickness of 3 mm (e.g., a 3-mm-thick sheet

[sheet-like molded body (injection molded body)] etc.), which is, for example, a value measured in accordance with the provisions of JIS K 7373 using a spectrophotometer (Shimadzu UV-3600) with illuminant C and a 2-degree observer angle in the wavelength range of 380 nm to 780 nm. The measurement may be made by the method described later in detail.

The acrylic polymer may have a relatively high total light transmittance.

The total light transmittance of the acrylic polymer may be, for example, 90% or more, preferably 91% or more, and more preferably 92% or more.

The upper limit of the total light transmittance may be 100%, for example, 99.9%, 99%, 98%, 97%, 96%, 95%, or the like.

The total light transmittance may be measured, for example, as a value at a thickness of 3 mm (e.g., a 3-mm-thick sheet [sheet-like molded body (injection molded body)] etc.), which is, for example, a value measured in accordance with the provisions of JIS K 7361 using a turbidity meter (NDH 5000, manufactured by NIPPON DENSHOKU INDUSTRIES CO., LTD.). The measurement may be made by the method described later in detail.

The yellowness index and total light transmittance of the acrylic polymer can be adjusted by changing, for example, the MFR (and also Mw, etc.) as described above, the production conditions of the acrylic polymer, and the type and amount of additives to be contained in the composition.

The present invention provides an acrylic polymer having excellent durability. Therefore, even after exposure to extreme conditions, the yellowness index and transparency can be maintained at a satisfactory level.

For example, when the yellowness index of the acrylic polymer after exposure to a temperature of 110° C. for 1,000 hours (without control of humidity) is Y1 and the yellowness index before exposure (treatment) is Y0, the absolute value of the difference between these two values (Y1−Y0) may be 1.0 or less, 0.9 or less, 0.8 or less, 0.7 or less, 0.6 or less, 0.5 or less, 0.4 or less, 0.3 or less, 0.2 or less, 0.1 or less, or the like.

Similarly, when the yellowness index of the acrylic polymer after exposure to a higher temperature of 125° C. for 1,000 hours (without control of humidity) is Y1 and the yellowness index before exposure (treatment) is Y0, the absolute value of the difference between these two values (Y1−Y0) is 1.5 or less, 1.4 or less, 1.3 or less, 1.2 or less, 1.1 or less, 1.0 or less, 0.9 or less, 0.8 or less, 0.7 or less, 0.6 or less, 0.5 or less, 0.4 or less, 0.3 or less, 0.2 or less, or the like.

Similarly, when the yellowness index of the acrylic polymer after exposure to high temperature and high humidity (85° C. and 85% RH) for 1,000 hours is Y1 and the yellowness index before exposure (treatment) is Y0, the absolute value of the difference between these two values (Y1−Y0) may be 1.0 or less, 0.9 or less, 0.8 or less, 0.7 or less, 0.6 or less, 0.5 or less, 0.4 or less, 0.3 or less, 0.2 or less, 0.1 or less, or the like.

When the total light transmittance of the acrylic polymer after exposure to a temperature of 110° C. for 1,000 hours (without control of humidity) is T1 and the total light transmittance before exposure (treatment) is T0, the absolute value of the difference between these two values (T1−T0) may be 1.0% or less, 0.9% or less, 0.8% or less, 0.7% or less, 0.6% or less, 0.5% or less, 0.4% or less, 0.3% or less, 0.2% or less, 0.1% or less, or the like.

Similarly, when the total light transmittance of the acrylic polymer after exposure to a higher temperature of 125° C. for 1,000 hours (without control of humidity) is T1 and the total light transmittance before exposure (treatment) is T0, the absolute value of the difference between these two values (T1−T0) may be 1.5% or less, 1.4% or less, 1.3% or less, 1.2% or less, 1.1% or less, 1.0% or less, 0.9% or less, 0.8% or less, 0.7% or less, 0.6% or less, 0.5% or less, 0.4% or less, 0.3% or less, 0.2% or less, 0.1% or less, or the like.

Similarly, when the total light transmittance of the acrylic polymer after exposure to high temperature and high humidity (85° C. and 85% RH) for 1,000 hours is Y1 and the total light transmittance before exposure (treatment) is Y0, the absolute value of the difference between these two values (Y1−Y0) is 1.0% or less, 0.9% or less, 0.8% or less, 0.7% or less, 0.6% or less, 0.5% or less, 0.4% or less, 0.3% or less, 0.2% or less, 0.1% or less, or the like.

The present invention provides an acrylic polymer (or composition or molded body) having relatively low (less) retardation.

The absolute value of the stress optical coefficient (Cr) of such an acrylic polymer may be, for example, $15 \times 10^{-11}$ Pa$^{-1}$ or less, and is preferably $10 \times 10^{-11}$ Pa$^{-1}$ or less, $5 \times 10^{-11}$ Pa$^{-1}$ or less, or $2 \times 10^{-11}$ Pa$^{-1}$ or less.

The stress optical coefficient may be measured, for example, by the method described later in the examples.

The Cr can be adjusted by changing, for example, the composition and ratio of the components of the acrylic polymer. When the Cr value of the acrylic polymer is in the range as described above, optical distortion (e.g., optical distortion upon molding) etc. can be efficiently reduced (suppressed).

The acrylic polymer may be produced by conventional methods, in particular, by the method described later.

Production Method of Acrylic Polymer

The present invention includes a method for producing an acrylic polymer. The acrylic polymer produced by this production method may be the same as that described in "Acrylic polymer" above. For example, the type and proportion of the ring structure and their preferable embodiments in the acrylic polymer obtained by the production method may be as exemplified above.

The acrylic polymer can be produced through at least the step of polymerizing polymerizable components (polymerization step).

The polymerizable component is a monomer that can be used as a source of acrylic polymers and is equivalent to the (meth)acrylic acid ester or additional monomer exemplified above. The type of monomer and its preferable embodiments are the same as described above.

Since the acrylic polymer has a lactone ring structure, the polymerizable components may include a monomer that can constitute the lactone ring structure or a monomer that can be a source of the lactone ring structure, although it depends on the type of lactone ring structure.

The polymerizable components may include a monomer that can be used as a source of a lactone ring, for example, a 2-(hydroxymethyl)acrylic acid ester (e.g., an alkyl ester such as ethyl 2-(hydroxymethyl)acrylate).

The polymerization may usually be radical polymerization.

The polymerization may be carried out in the presence of a polymerization initiator, in particular, a radical polymerization initiator.

The polymerization initiator (radical polymerization initiator) is not particularly limited, and examples include organic peroxides [e.g., peroxides (dialkyl peroxides, diacyl peroxides, etc.), peroxymonocarbonates, peroxyesters, peroxyketals, etc.] and azo compounds.

Specific examples of the polymerization initiator include organic peroxides [e.g., tert-amylperoxyisononanoate, t-amyl peroxy-2-ethylhexanoate, tert-butyl peroxy-3,5,5-trimethylhexanoate, tert-butyl peroxy laurate, tert-butyl peroxy isopropyl monocarbonate, tert-hexyl peroxy isopropyl monocarbonate, tert-butyl peroxyacetate, 1,1-bis(tert-butylperoxy)-3,3,5-trimethylcyclohexane, 1,1-bis(tert-butylperoxy)cyclohexane, tert-butyl peroxy 2-ethyl hexanate, tert-butyl peroxy isobutyrate, tert-hexyl peroxy 2-ethyl hexanate, di-tert-butyl peroxide, 2,5-dimethyl-2,5-bis(tert-butylperoxy)hexane, etc.] and azo compounds [e.g., 2-(carbamoylazo)-isobutyronitrile, 1,1'-azobis(1-cyclohexanecarbonitrile), 2,2'-azobisisobutyronitrile, 2,2'-azobis(2-methylbutyronitrile), dimethyl 2,2'-azobisisobutyrate, 2,2'-azobis(2,4,4-trimethylpentane), 2,2'-azobis(2-methylpropane), etc.].

One kind of polymerization initiator or a combination of two or more kinds of polymerization initiators may be used.

In particular, it is preferable to use at least an organic peroxide (such as a peroxy ester) as the polymerization initiator.

The amount (ratio) of the polymerization initiator used, although it depends on the type of polymerization initiator, may be, for example, 0.01 part by mass or more, preferably 0.05 part by mass or more, more preferably 0.1 part by mass or more, particularly 0.15 part by mass or more or the like, or may be 0.2 part by mass or more (e.g., 0.25 part by mass or more, 0.28 part by mass or more, 0.3 part by mass or more, 0.32 part by mass or more, 0.35 part by mass or more, 0.38 part by mass or more, 0.4 part by mass or more, 0.42 part by mass or more, 0.45 part by mass or more, 0.48 part by mass or more, 0.5 part by mass or more, 0.52 part by mass or more) relative to 100 parts by mass of the polymerizable components.

The upper limit of the amount of the polymerization initiator used is not particularly specified and may be, for example, 10 parts by mass, 9 parts by mass, 8 parts by mass, 7 parts by mass, 6 parts by mass, 5 parts by mass, 4.5 parts by mass, 4 parts by mass, 3.5 parts by mass, 3.2 parts by mass, 3 parts by mass, 2.8 parts by mass, 2.5 parts by mass, 2.2 parts by mass, 2 parts by mass, 1.8 parts by mass, 1.5 parts by mass, 1.2 parts by mass, 1 part by mass, 0.9 part by mass, 0.8 part by mass, 0.7 part by mass, or the like relative to 100 parts by mass of the polymerizable components.

In particular, in the present invention, the ratio of the polymerization initiator used relative to 100 parts by mass of the polymerizable components may be relatively large [e.g., 0.2 part by mass or more, 0.3 part by mass or more, 0.4 part by mass or more (e.g., 0.4 to 0.8 part by mass), etc.].

The use of a relatively large amount of the polymerization initiator as described above makes it easy to efficiently obtain an acrylic polymer that is advantageous in terms of melt flowability etc. In addition, even when a chain transfer agent is used, it is easy to ensure a sufficient polymerization reaction rate and efficiently obtain an acrylic polymer having good melt flowability.

The polymerization may be carried out in the presence of a chain transfer agent.

Examples of the chain transfer agent include thiol compounds {e.g., primary thiols [e.g., aliphatic primary thiols (e.g., primary alkyl mercaptans such as butanethiol, octanethiol, decanethiol, dodecanethiol (n-dodecyl mercaptan), hexadecanethiol, octadecanethiol, and decanetrithiol, preferably primary $C_{3\text{-}30}$ alkyl mercaptans) etc.], secondary thiols [e.g., aliphatic secondary thiols (e.g., secondary alkyl mercaptans such as 2-propanethiol, 2-butanethiol, 2-methyl-1-propanethiol, 3-methyl-2-butanethiol, 3-pentanethiol, 2-decanethiol, 3-decanethiol, 4-decanethiol, 5-decanethiol, 2-hexadecanethiol, 5-hexadecanethiol, and 8-octadecanethiol, preferably secondary $C_{3\text{-}30}$ alkyl mercaptans), alicyclic secondary thiols (e.g., cycloalkyl mercaptans such as cyclohexanethiol and cyclopentanethiol, preferably $C_{3\text{-}20}$ cycloalkyl mercaptans), aromatic secondary thiols (e.g., aryl mercaptans such as thiophenol, preferably $C_{6\text{-}20}$ aryl mercaptans), etc.], and tertiary thiols [e.g., aliphatic tertiary thiols (e.g., tert-alkyl mercaptans such as tert-butyl mercaptan, tert-dodecyl mercaptan, tert-nonyl mercaptan, and tert-hexyl mercaptan, preferably $C_{3\text{-}30}$ tert-alkyl mercaptans), etc.]}.

When the chain transfer agent contains a polyfunctional thiol, the proportion of the polyfunctional thiol in the chain transfer agent may be small. The amount (proportion) of the polyfunctional thiol in the chain transfer agent may be, for example, 20% by mass or less (e.g., 15% by mass or less), preferably 10% by mass or less (e.g., 5% by mass or less), more preferably 3% by mass or less, or may be 1% by mass or less, 0.5% by mass or less, or the like.

One kind of chain transfer agent or two or more kinds of chain transfer agents may be used.

The amount (ratio) of the chain transfer agent may be, for example, 0.001 part by mass or more, preferably 0.005 part by mass or more, more preferably 0.01 part by mass or more, in particular 0.015 part by mass or more or the like, or may be 0.02 part by mass or more relative to 100 parts by mass of the polymerizable components.

The upper limit of the amount of the chain transfer agent used is not particularly specified and may be, for example, 5 parts by mass, 4 parts by mass, 3 parts by mass, 2 parts by mass, 1.5 parts by mass, 1 part by mass, 0.5 part by mass, 0.25 part by mass, 0.2 part by mass, 0.15 part by mass, 0.1 part by mass, 0.08 part by mass, 0.07 part by mass, or the like relative to 100 parts by mass of the polymerizable components.

In particular, in the present invention, the ratio of the chain transfer agent to 100 parts by mass of the polymerizable components may be relatively small [e.g., 0.5 part by mass or less, 0.1 part by mass or less (e.g., 0.001 to 0.1 part by mass), etc.] from the viewpoint of discoloration resistance.

Even when the chain transfer agent is used in such a relatively smaller amount, it is easy to efficiently obtain an acrylic polymer that is advantageous in terms of melt flowability etc.

The mass ratio of the chain transfer agent and the polymerization initiator is preferably ½ or less, and more preferably ⅓ or less, ¼ or less, or ⅕ or less from the viewpoint of melt flowability and discoloration resistance of the acrylic polymer. The mass ratio of the chain transfer agent and the polymerization initiator is calculated from (mass of chain transfer agent)/(mass of polymerization initiator).

If necessary, the polymerization may be carried out in the presence of an additional component (e.g., a pH adjuster, various catalysts, etc.) in addition to a polymerization initiator and a chain transfer agent.

The polymerization may be block polymerization, solution polymerization, suspension polymerization, emulsion polymerization, or the like, and in particular, solution polymerization is preferred for the production of polymers that contain no impurities and have consistent flowability. In solution polymerization, relatively uniform polymerization is achieved, and thus the formation of polymers with a significantly higher molecular weight tends to be prevented as compared to bulk polymerization, making it easier to efficiently obtain polymers with consistent flowability. In addition, as compared to suspension polymerization and emulsion polymerization, it is easier to efficiently obtain highly transparent polymers because of the absence of impurities such as emulsifiers.

When polymerization is performed in a solvent (e.g., when solution polymerization is performed), the solvent can be selected according to the type of polymerizable component and is not particularly limited. Examples of the solvent include organic solvents [aromatic hydrocarbons (e.g., benzene, toluene, xylene, ethylbenzene, etc.), aliphatic or alicyclic hydrocarbons (e.g., cyclohexane, methylcyclohexane, etc.), halogenated solvents (e.g., chloroform, methylene chloride, carbon tetrachloride, etc.)], ketones (e.g., acetone, methyl ethyl ketone, etc.), esters (e.g., ethyl acetate, butyl acetate, etc.), ethers [e.g., chain ethers (e.g., diethyl ether, etc.), cyclic ethers (e.g., tetrahydrofuran, dioxane, etc.), etc.], amides [e.g., N-substituted amides (N-alkyl-substituted alkanamides such as N,N-dimethylformamide)], alcohols (e.g., alkanols such as methanol, ethanol, and isopropanol), and glycol ethers (e.g., monoalkyl ethers of alkanediols or polyalkanediols, such as ethylene glycol monomethyl ether, ethylene glycol monoethyl ether, propylene glycol monomethyl ether, diethylene glycol monoethyl ether, etc.).

One kind of solvent or a combination of two or more kinds of solvents may be used.

In the polymerization, for the purposes of preventing molecular weight increase and enhancing productivity, the concentration of the polymerizable components in the entire polymerization system may be, for example, 20% by mass or more (e.g., 20 to 70% by mass), preferably 35% by mass or more (e.g., 35 to 65% by mass), more preferably 40% by mass or more (e.g., 40 to 60% by mass), and in particular 45% by mass or more (e.g., 45 to 55% by mass).

All components (e.g., a polymerizable component, a polymerization initiator, a chain transfer agent, an additional component, a solvent, etc.) may be present in (fed into) the reaction system (reaction vessel) at the start of polymerization or may be serially added (or admixed) in the course of the polymerization. Both may be combined. In such a case, the rate and timing of the addition of each component can be selected as appropriate.

Each component may be added to the reaction system in several portions (2 or more portions, e.g., 2 to 5 portions).

In particular, the polymerizable component (monomer) may be added to the reaction system in the course of the polymerization, in which case the polymerizable component may be added in several portions or added dropwise. In the case of dropwise addition of the polymerizable component, it is easy to obtain an acrylic polymer having a relatively narrow molecular weight distribution.

The polymerization initiator may also be added to the reaction system in the course of the polymerization. In particular, when the polymerizable component is added dropwise to the reaction system, it is preferable that the polymerization initiator is also added dropwise to the reaction system. The addition of the polymerization initiator to the reaction system in the course of the polymerization ensures safety or is expected to yield a polymer having a relatively narrow molecular weight distribution.

When the polymerizable component and the polymerization initiator are added dropwise, the addition rate is not particularly limited, and from the viewpoint of the ease of obtaining an acrylic polymer having a relatively low molecular weight, it is preferable to add them slowly, for example, over one hour or more (e.g., 1 to 10 hours).

The polymerization is usually carried out at a predetermined temperature (or under heating). The temperature of the polymerization (reaction temperature) can be selected according to the type of polymerizable component, polymerization initiator, solvent, etc. For example, the temperature may be 20° C. or higher, preferably 30° C. or higher (e.g., 35 to 180° C.), more preferably 40° C. or higher (e.g., 45 to 170° C.), in particular 50° C. or higher (e.g., 55 to 160° C.), particularly preferably 60° C. or higher (e.g., 65 to 1500° C.), or may usually be about 70 to 140° C. (e.g., 80 to 130° C.)

The polymerization temperature may be changed in the course of the polymerization, but even in such a case, the polymerization is usually carried out within the above temperature range.

The polymerization may be carried out with stirring. The polymerization may be carried out in an air atmosphere or in an inert atmosphere (in a nitrogen, helium, or argon atmosphere, etc.).

The duration of the polymerization (including an aging step) can be selected according to the amount of the polymerizable component, the polymerization temperature, etc., and is not particularly limited. For example, the polymerization duration may be 30 minutes or more (e.g., 40 minutes to 24 hours), preferably 1 hour or more (e.g., 1.5 to 16 hours), and more preferably 2 hours or more (e.g., 2.5 to 12 hours).

The acrylic polymer has a lactone ring structure. The lactone ring structure can be formed during the polymerization as described above; or after polymerization, the lactone ring structure can be formed or introduced into the acrylic polymer through the step of forming or introducing the ring structure. The method for forming or introducing the lactone ring structure is not particularly limited and any known method can be used.

The lactone ring structure can be formed or introduced, for example, by cyclization (cyclocondensation, cyclization treatment) of an acrylic polymer containing a monomer unit that can be used as a source of the lactone ring [e.g., a 2-(hydroxymethyl)acrylic acid ester] as described above. The cyclization may be carried out in the presence of a cyclization catalyst [e.g., a phosphorus catalyst (e.g., a phosphoric acid ester such as stearyl phosphate)].

The acrylic polymer can be obtained through such a polymerization step (and cyclization step, if necessary).

The acrylic polymer obtained through the polymerization step may be purified and separated using conventional methods as appropriate.

Application, Composition, Molded Body, Etc.

The acrylic polymer can be used as a resin and may constitute a composition (resin composition).

Therefore, the present invention encompasses a composition comprising the acrylic polymer.

In the description, the term "resin" is a broader concept than that of the term "polymer (also referred to as polymeric material)". The resin can contain one or more polymers. The term "composition (resin composition)" can comprise a material other than the polymer, such as an additive.

In the composition, the resin ingredient (sometimes referred to as resin (A)) may consist of the acrylic polymer alone, or the resin ingredient may be composed of the acrylic polymer in combination with an additional polymer (a polymer that does not belong to the category of the acrylic polymer (A1)).

Usually, the composition (resin composition) may be a thermoplastic composition (thermoplastic resin composition).

The additional polymer can be selected according to the desired physical properties, application, etc. and is not particularly limited. The additional polymer can be a thermoplastic polymer, a curable polymer, or a combination thereof. One kind of additional polymer or a combination of two or more kinds of additional polymers may be used.

Specific examples of the additional polymer include olefin polymers (e.g., polyethylene, polypropylene, ethylene-propylene copolymer, poly(4-methyl-1-pentene), etc.), halogenated polymers (e.g., vinyl halide polymers such as polyvinyl chloride, polyvinylidene chloride, and polyvinyl chloride), styrene polymers [e.g., polystyrene, styrene copolymers (e.g., styrene-methyl methacrylate copolymer, styrene-acrylonitrile copolymer, acrylonitrile-butadiene-styrene block copolymer (ABS resin), acrylate-styrene-acrylonitrile copolymer (ASA resin), etc.) etc.], polyester polymers (e.g., aromatic polyesters such as polyethylene terephthalate, polybutylene terephthalate, and polyethylene naphthalate), polyamide polymers (e.g., aliphatic polyamide polymers such as polyamide 6, polyamide 66, and polyamide 610), polyacetal polymers, polycarbonate polymers, polyphenylene oxide polymers, polyphenylene sulfide polymers, polyetherether ketone polymers, polysulfone polymers, polyethersulfone polymers, and rubber-based polymers [e.g., styrene polymers blended with rubber (polybutadiene rubber, acrylic rubber, etc.) (e.g., styrene copolymers such as ABS resin and ASA resin) etc.].

In addition, acrylic polymers are included in the examples of the additional polymer. Examples of the acrylic polymer include acrylic polymers that do not belong to the category of the above-mentioned acrylic polymer (A1), which are, for example, acrylic polymers having no ring structure, including methacrylic polymers having a structural unit derived from a methacrylic acid ester (e.g., methyl methacrylate and other methacrylic acid esters listed in the above examples), for example, polymers having a methacrylic acid ester as a polymerizable component, such as polymethyl methacrylate, and polymers having a methacrylic acid ester and an aromatic vinyl compound as polymerizable components, such as methyl methacrylate-styrene copolymer.

In addition, cellulosic polymers are included in the examples of the additional polymer. Examples of the cellulosic polymer (cellulose derivative) include cellulose esters [e.g., cellulose acrylates such as cellulose acetate (cellulose diacetate, cellulose triacetate), cellulose propionate, cellulose butyrate, cellulose acetate propionate, and cellulose acetate butyrate], cellulose ethers [e.g., alkyl cellulose (e.g., methyl cellulose, ethyl cellulose, etc.), hydroxyalkyl cellulose (e.g., hydroxyethyl cellulose, hydroxyalkyl cellulose, etc.), carboxyalkyl cellulose (e.g., carboxymethyl cellulose etc.)], and cyanoethyl cellulose.

In addition, thermoplastic elastomers are included in the examples of the additional polymer. The thermoplastic elastomer is not particularly limited, and examples include styrene elastomers, olefin elastomers, urethane elastomers, and amide elastomers.

The configuration in which the acrylic polymer (A1) and the additional polymer coexist in the resin is not particularly limited and may be a polymer blend or a configuration in which the acrylic polymer (A1) and the additional polymer may be chemically bound to each other.

When the resin contains the additional polymer, the proportion of the additional polymer in the resin ingredient (the combined amount of the acrylic polymer (A1) and the additional polymer) can be, for example, about 90% by mass or less (e.g., 0.1 to 85% by mass), about 80% by mass or less (e.g., 0.5 to 70% by mass), preferably about 60% by mass or less (e.g., 1 to 55% by mass), or may be 50% by mass or less (e.g., 2 to 45% by mass) or the like.

For the purpose of efficiently utilizing the properties of the acrylic polymer (A1) (high flowability, high heat resistance, low discoloration, etc.), it is preferable that the proportion of the additional polymer (in particular, a non-acrylic polymer) in the resin is not too large.

In the resin (A), the proportion of the acrylic polymer (A1) can be, for example, 10% by mass or more (e.g., 15 to 100% by mass), 20% by mass or more (e.g., 30% by mass or more), preferably 40% by mass or more (e.g., 45% by mass or more), more preferably 50% by mass or more (e.g., 55% by mass or more), or may be 60% by mass or more (e.g., 65% by mass or more), 70% by mass or more (e.g., 75% by mass or more), or 80% by mass or more (e.g., 85% by mass or more).

The composition at least comprises the acrylic polymer (A1) (or resin (A)) and may comprise an additional ingredient (additive) as necessary. Examples of the additional ingredient include, but are not limited to, UV absorbers, antioxidants, stabilizers, reinforcers, flame retardants, antistatic agents, organic fillers, inorganic fillers, anti-blocking agents, resin modifiers, organic fillers, inorganic fillers, plasticizers, lubricants, retardation reducers, and colorants.

The ultraviolet absorption of the ultraviolet absorber (UVA) may be in the wavelength range of 300 to 380 nm, and the molar absorptivity at the wavelength of maximum absorption for UVA (in chloroform solution) may be 10,000 ($L·mol^{-1}·cm^{-1}$) or more.

The ultraviolet absorber (UVA) is not particularly limited, and examples include benzophenone compounds, salicylate compounds, benzoate compounds, triazole compounds, and triazine compounds.

The triazole compounds include, for example, 2,2'-methylenebis[4-(1,1,3,3-tetramethylbutyl)-6-(2H-benzotriazol-2-yl)phenol], 2-(3,5-di-t-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-t-butylphenol, 2-[5-chloro(2H)-benzotriazol-2-yl]-4-methyl-6-(t-butyl)phenol, 2-(2H-benzotriazol-2-yl)-4,6-di-t-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, a reaction product obtained from methyl 3-(3-(2H-benzotriazol-2-yl)-5-t-butyl-4-hydroxyphenyl)propionate and polyethylene glycol 300, 2-(2H-benzotriazol-2-yl)-6-(linear and side-chain dodecyl)-4-methylphenol, 2-(5-methyl-2-hydroxyphenyl)benzotriazole, 2-[2-hydroxy-3,5-bis(α,α-dimethylbenzyl)phenyl]-2H-benzotriazole, and 3-(2H-benzotriazol-2-yl)-5-(1,1-dimethylethyl)-4-hydroxy-C7-9 side chain and linear alkyl esters. Triazole compounds with a halogen atom, such as a chlorine atom, are preferred because of their high UV absorption.

The triazine compounds are, for example, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-hexyloxy-3-methylphenyl)-1,3,5-triazine, and UVAs having a 2,4-bis(2,4-dimethylphenyl)-6-[2-hydroxy-4-(3-alkyloxy-2-hydroxypropyloxy)-5-α-cumylphenyl]-s-triazine skeleton (alkyloxy; long-chain alkyloxy groups such as octyloxy, nonyloxy, and decyloxy). Among them, preferred are UVAs having a 2,4-bis(2,4-dimethylphenyl)-6-[2-hydroxy-4-(3-alkyloxy-2-hydroxypropyloxy)-5-α-cumylphenyl]-s-triazine skeleton (alkyloxy; long-chain alkyloxy groups such as octyloxy, nonyloxy, and decyloxy) due to their excellent UV absorption.

The molecular weight of the UVA is not particularly limited and is preferably 600 or more. The upper limit of the molecular weight of UVA may be, for example, 10,000, 8,000, 5,000, or the like.

One kind of UV absorber or a combination of two or more kinds of UV absorbers may be used.

The colorant is not particularly limited and can be selected according to the application of the composition, etc. For example, the colorant may be a pigment (e.g., an inorganic pigment, an organic pigment), a dye, or the like.

In addition, the colorant may have a bluing property [a property that corrects (counteracts) and suppresses the color (e.g., yellow) of the acrylic polymer or composition].

Such a colorant may be a colorant (compound) having a maximum absorbance at a wavelength of 520 to 600 nm, 540 to 580 nm, etc., although it depends on the color to be corrected.

Such a colorant can be selected according to the type (wavelength) of color to be corrected, etc., and examples include compounds having an anthraquinone skeleton (anthraquinone compounds), compounds having a phthalocyanine skeleton (phthalocyanine compounds), compounds having an azo skeleton (azo compounds), and compounds having a triarylmethane skeleton (triarylmethane compounds).

Among these, compounds having an anthraquinone skeleton etc. are preferred from the viewpoint of heat resistance etc.

Specific examples of the colorant having a bluing property (bluing agent) include anthraquinone dyes [e.g., Solvent Violet 13 (CA. No. (color index number) 60725), Solvent Violet 14, Solvent Violet 31 (CA. No. 68210), Solvent Violet 33 (CA. No. 60725), Solvent Violet 36 (CA. No. 68210), Solvent Blue 45 (CA. No. 61110), Solvent Blue 94 (CA. No. 61500), Solvent Blue 87, Solvent Blue 97, Disperse Violet 28, etc.], phthalocyanine dyes [e.g., Solvent Blue 25 (CA. No. 74350) etc.], monoazo dyes [e.g., Solvent Violet 21 etc.], and triarylmethane dyes [e.g., Solvent Blue 2 (CA. No. 42563) etc.].

Such colorants are commercially available. For example, Macrolex (registered trademark) Violet B, Macrolex (registered trademark) Violet 3R, and Macrolex (registered trademark) Blue RR (manufactured by LANXESS); Sumiplast (registered trademark) Violet B and Sumiplast (registered trademark) Green G (manufactured by Sumika Chemtex Corporation); Polysynthren (registered trademark) Blue RLS (manufactured by Clariant); Diaresin Violet D, Diaresin Blue G, and Diaresin Blue N (manufactured by Mitsubishi Chemical Corporation); etc. may be used.

According to a study from the present inventors, the acrylic polymer is relatively likely to discolor (e.g., turn yellow), probably due to the ring structure of the polymer. In particular, this tendency seems to be more pronounced when the proportion of the ring structure is higher.

In the present invention, such discoloration can be relatively suppressed by optimizing the production conditions, etc., as described above, but even more efficiently suppressed or reduced by the combination with using such a colorant, in particular, in terms of the degree of yellowing.

Surprisingly, the use of such a colorant can improve durability as well. For example, when the acrylic polymer of the present invention is combined with the colorant, low discoloration and high transparency can be efficiently retained even after exposure to extreme conditions as described above.

One kind of additional ingredient or a combination of two or more kinds of additional ingredients may be used.

When the composition comprises the additional ingredient (non-resin ingredient), the proportion of the additional ingredient in the composition may be, for example, about 0.01 to 10% by mass (e.g., 0.05 to 5% by mass).

In particular, the composition of the present invention may be substantially free of a UV absorber. According to a study from the present inventors, UV absorbers appear to be a cause for discoloration and reduced transparency of the acrylic polymer having a ring structure (or a composition thereof, or a molded product thereof). By limiting the amount of the UV absorber used (in combination with using a colorant), it is feasible to efficiently suppress discoloration and retain high transparency.

In this case, the proportion of the UV absorber in the composition may be, for example, 0.5% by mass or less (e.g., less than 0.5% by mass, 0.1% by mass or less, 0% by mass, or the limit of detection) or the like, and the proportion of the UV absorber relative to 100 parts by mass of the acrylic polymer may be 0.5 part by mass or less (e.g., less than 0.5 part by mass, 0.1 part by mass or less, less than 0.1 part by mass, 0 part by mass, or the limit of detection) or the like.

In particular, when the composition comprises a colorant, the proportion of the colorant may be selected according to the type of colorant etc. For example, the proportion of the colorant in the composition may be 10 mass ppm or less, preferably 5 mass ppm or less (e.g., 0.01 to 5 mass ppm), more preferably 3 mass ppm or less (e.g., 0.05 to 3 mass ppm), in particular 1 mass ppm or less (e.g., 0.1 to 1 mass ppm), or may be 0.8 mass ppm or less (e.g., 0.01 to 0.7 mass ppm), 0.5 mass ppm or less (e.g., 0.05 to 0.4 mass ppm), or the like, or may be a relatively small proportion [e.g., 800 mass ppb (0.8 mass ppm) or less (e.g., 5 to 700 mass ppb), 500 mass ppb or less (e.g., 10 to 450 mass ppb), 400 mass ppb or less (e.g., 20 to 380 mass ppb), 350 mass ppb or less (e.g., 30 to 330 mass ppb), 300 mass ppb or less (e.g., 40 to 280 mass ppb), 250 mass ppb or less (e.g., 50 to 230 mass ppb), etc.].

In the present invention, it appears that even a relatively small amount of the colorant used can efficiently suppress discoloration and improve durability. In particular, in the present invention, surprisingly, it is feasible to efficiently balance low discoloration (yellowness index) and high transparency, which are in a trade-off relationship, and to efficiently obtain a composition having excellent durability.

The weight-average molecular weight, melt flow rate, glass transition temperature, yellowness index (degree of yellowing), total light transmittance, durability, etc. of the composition (or resin (A)) may be the same or different from those of the acrylic polymer described above.

In particular, the melt flow rate, degree of yellowing, total light transmittance, etc. of the composition (or resin (A)) may be in the same ranges for those of the acrylic polymer as described above.

The present invention includes a molded body (molded product) comprising (formed from) the acrylic polymer (A1) (or resin (A)) or the composition.

The shape of such a molded body is not limited and may be either a two-dimensional shape [e.g., a film (or sheet)], a three-dimensional shape (e.g., a block shape), or the like.

The molded body (molded product) may have the same physical properties as those of the composition described above (the degree of yellowing, glass transition temperature, total light transmittance, etc.). The values of these properties can be selected from the same ranges as described above.

For example, the yellowness index (YI) of the molded body may be 2 or less, preferably 1.7 or less, more preferably 1.5 or less, or may be 1.4 or less, 1.3 or less, 1.2 or less, 1.1 or less, 1.0 or less, 0.9 or less, 0.8 or less, 0.7 or less, 0.6 or less, 0.5 or less, or the like.

The lower limit of the yellowness index may be 0 (or the limit of detection) or a finite value (e.g., 0.01, 0.02, 0.05, 0.1, 0.15, 0.2, 0.25, 0.3, 0.35, etc.).

These upper and lower limits may be combined to set an appropriate range (e.g., 0.01 to 2.0, 0.05 to 1.7, 0.1 to 1.5, 0.1 to 1.3, etc.) for the yellowness index of the molded body (the same applies to the others).

The yellowness index may be measured, for example, as a value at a thickness of 3 mm (e.g., a 3-mm-thick sheet [sheet-like molded body (injection molded body)] etc.), which is, for example, a value measured in accordance with the provisions of JIS K 7373 using a spectrophotometer (Shimadzu UV-3600) with illuminant C and a 2-degree observer angle in the wavelength range of 380 nm to 780 nm. The measurement may be made by the method described later in detail.

The total light transmittance of the molded body may be, for example, 90% or more, preferably 91% or more, and more preferably 92% or more.

The upper limit of the total light transmittance may be 100%, for example, 99.9%, 99%, 98%, 97%, 96%, 95%, or the like.

The total light transmittance may be measured, for example, as a value at a thickness of 3 mm (e.g., a 3-mm-thick sheet [sheet-like molded body (injection molded body)] etc.), which is, for example, a value measured in accordance with the provisions of JIS K 7361 using a turbidity meter (NDH 5000, manufactured by NIPPON DENSHOKU INDUSTRIES CO., LTD.). The measurement may be made by the method described later in detail.

The production method (molding method) of the molded body can be selected according to the form of the molded body etc. Known molding methods (e.g., extrusion molding, injection molding, cast molding, blow molding, foam molding, etc.) can be used.

In particular, the acrylic polymer (A1) (or resin (A)) of the present invention has relatively high melt flowability as described above and thus can be used to efficiently produce molded products using injection molding etc., which molding method may require melt flowability. Moreover, the acrylic polymer (A1) often has low discoloration, and such low discoloration can be retained even after melt molding.

For these reasons, the molded body may be an injection molded body (injection molded product) among others.

The molded body can be used for a variety of applications and is suitable for optical applications, for example.

Specific applications include, for example, light guiding members, film applications [e.g., protective films (protective films for optical use, etc.), optical films (optical sheets), etc.], lenses (optical lenses etc.), covers (lens covers etc.), and foam (foam-molded product) applications (e.g., cushioning materials, heat-retaining and heat-insulating materials, damping materials, soundproof materials, sealing materials, packing materials, etc.).

The lenses (optical lenses etc.) include, for example, Fresnel lenses, linear Fresnel lenses, lenticular lenses, planar prisms, fly-eye lenses, aspheric lenses, condenser lenses, microlenses, collimator lenses, concave lenses, convex lenses, and diffractive lenses.

The applications of lenses (lens members) include, for example, head-up displays, cameras (e.g., in-vehicle cameras), and LIDAR devices. The lenses for such applications include, for example, Fresnel lenses and condenser lenses for head-up displays, and Fresnel lenses, condenser lenses, collimator lenses, and convex lenses for LIDAR devices.

The light guiding members include, for example, members used as light guides [or lighting equipment, e.g., lamps, lights, etc.]. The light guide may be for automobiles, motorcycles, etc. The area where the light guide is installed (or the application of the light guide) is not particularly limited. Examples include headlamps, tail lamps, brake lamps, side mirror lamps, and daytime running lights (DRLs) in automobiles.

Specific members (light guiding members) include light covers and light guides {light guides for vehicle lamps [e.g., light guides for automobile headlamps (e.g., light guides for DRLs etc.) etc.]}.

The production method of the light guiding member, such as a light guide (a light guide for vehicle lamps), is not particularly limited. For example, the light guiding member may be produced from the acrylic polymer (A1) (or resin (A)) or composition by any of the known molding methods listed in the above examples.

The protective films include, for example, protective films for various optical disc (VD, CD, DVD, MD, LD, etc.) substrates and polarizer protective films used for polarizing plates of liquid crystal displays.

The optical films (optical sheets) include, for example, retardation films, zero-order retardation films (with infinitesimally small in-plane and thickness-direction retardation values), viewing angle compensation films, light diffusion films, reflection films, anti-reflection films, anti-glare films, brightness enhancement films, conductive films for touch panels, diffusion plates, light guides, retardation plates, zero-order retardation plates, and prism sheets.

Since the acrylic polymer (A1) (or resin (A) or composition) of the present invention can be used in molding methods such as injection molding as described above, the molded body may be a three-dimensional molded body among others.

In particular, light guiding members (light guides etc.) and other molded products may require very low discoloration (and even high heat resistance, etc.), and the acrylic polymer (A1) (or resin (A) or composition) of the present invention is suitable for constituting such molded products.

In addition, lens members (e.g., lens members of head-up displays or in-vehicle cameras) and other molded products may require high heat resistance and very low discoloration (and even high transparency and durability), and the acrylic polymer (A1) (or resin (A) or composition) of the present invention is suitable for constructing such molded products.

The physical properties of such molded products (e.g., yellowness index, transparency, durability, etc.) may be in the same ranges as described above (e.g., yellowness index may be 2 or less, preferably 1.7 or less, more preferably 1.5 or less, or may be 1.4 or less, 1.3 or less, 1.2 or less, 1.1 or less, 1.0 or less, 0.9 or less, 0.8 or less, 0.7 or less, 0.6 or less, or 0.5 or less).

The present invention is not limited to the aforementioned embodiments, and various modifications can be made within the scope of the appended claims. Other embodiments obtainable by suitably combining technical means disclosed in different embodiments of the present invention are also included in the present invention.

EXAMPLES

Hereinafter, the present invention will be described in more detail by way of Examples and Comparative Examples, but the present invention is not limited thereto.

In the following, "%" and "part" refer to "% by weight" and "part by weight", respectively, unless otherwise specified.

The measurements and evaluations of various physical properties in the Examples shown below were performed by the following methods.

Weight-Average Molecular Weight (Mw) and Molecular Weight Distribution (Mw/Mn)

The weight-average molecular weight and molecular weight distribution of resins were determined by gel permeation chromatography (GPC) in terms of polystyrene. The measurement apparatus and the measurement conditions are as follows. System: GPC system HLC-8320 (manufactured by TOSOH) Column composition for sample measurement
- Guard column: TSK guardcolumn SuperHZ-L (manufactured by TOSOH)
- Separation column: TSKgelSuperHZM-M (manufactured by TOSOH), two columns connected in series Column composition for reference measurement
- Reference column: TSKgel SuperH-RC (manufactured by TOSOH) Developing solvent: THF (special grade, manufactured by Wako Pure Chemical Industries)

Flow rate of developing solvent: 0.6 mL/min
Standard sample: TSK standard polystyrene (PS-Oligomer Kit, manufactured by TOSOH)
Column temperature: 40° C.
Glass Transition Temperature (Tg)

The glass transition temperature was measured in accordance with the provisions of JIS K 7121 (JIS K 7121-1987). The specific procedure was as follows. In a differential scanning calorimeter ("Thermo plus EVO DSC-8230", manufactured by Rigaku Corporation), about 10 mg of a sample was heated from ordinary temperature to 200° C. (heating rate: 20° C./min) under a nitrogen gas atmosphere. From the resulting DSC curve, the glass transition temperature was determined by the onset point method.
α-alumina was used as the reference.
Melt Flow Rate (MFR)

The melt flow rate was measured at a temperature of 230° C. under a load of 3.8 kg (37 N) according to Protocol A of JIS K 7210 (JIS K 7210-1:2014).
Proportion of Lactone Ring Structure Contained in Acrylic Resin First, a dynamic TG measurement was performed to determine the de-alcoholization reaction rate of the polymer. Based on the weight loss calculated on the assumption that all hydroxyl groups in the polymer composition have participated in a de-alcoholization (de-methanolization) reaction, the de-alcoholization reaction rate was determined from the actual weight loss measured in the dynamic TG measurement from 150° C., the temperature at which the weight loss was about to start, to 300° C., the temperature at which the decomposition of the polymer was about to start.

More specifically, the weight loss percentage in the dynamic TG measurement from 150° C. to 300° C. is measured on the polymer having a lactone ring structure, and the measured weight loss percentage is denoted as (X).

On the other hand, the weight loss percentage is theoretically calculated on the assumption that all hydroxyl groups in the polymer composition participate in a de-alcoholization reaction to form lactone rings, and the theoretical weight loss percentage is denoted as (Y) (i.e., the weight loss percentage calculated on the assumption that 100% de-alcoholization has occurred in the polymer composition).

The theoretical weight loss percentage (Y) can be calculated from the molar ratio of the monomer having a hydroxyl group, which can participate in de-alcoholization, in the polymer, i.e., the proportion of such a monomer in the polymer composition.

These values (X) and (Y) are substituted into the formula for rate of de-alcoholization reaction: 1−(measured weight loss percentage (X)/theoretical weight loss percentage (Y)), and the resulting value is converted to a percentage to give the de-alcoholization reaction rate.

The proportion of the lactone ring structure in the pellets obtained in Example 1 shown below is calculated. The theoretical weight loss percentage (Y) of this polymer is determined as follows: the molecular weight of methanol is 32, the molecular weight of methyl 2-(hydroxymethyl)acrylate is 116, the proportion (by weight) of methyl 2-(hydroxymethyl)acrylate in the polymer is 10% by weight in the composition, and thus, the theoretical weight loss percentage (Y) is $(32/116)\times10\approx2.76\%$ by weight. On the other hand, the measured weight loss percentage (X) in the dynamic TG measurement was 0.06% by weight. These values are substituted into the above formula for rate of de-alcoholization reaction to give $1-(0.06/2.76)\approx0.978$, which means that the de-alcoholization reaction rate is 97.8%.

In the case of Example 1, the proportion of methyl 2-(hydroxymethyl)acrylate in the copolymer is 10.0% by weight, the calculated de-alcoholization reaction rate is 97.8% by weight, and the formula weight of the lactone-cyclized structural unit generated by condensation of methyl 2-(hydroxymethyl)acrylate (having a molecular weight of 116) with methyl methacrylate is 170. From these values, the proportion of the lactone ring in the copolymer is calculated as $(10.0\times0.978\times170/116)=14.3\%$ by weight.

Total Light Transmittance (Tt)

The total light transmittance was measured on a molded body having a thickness of 3 mm using a turbidity meter (NDH 5000, manufactured by NIPPON DENSHOKU INDUSTRIES CO., LTD.) in accordance with the provisions of JIS K 7361 (JIS K 7361-1: 1997). For the production of the molded body, the obtained pellets were dried at 100° C. for 12 hours or more and then injected into an injection molding machine (NISSEI PLASTIC INDUSTRIAL CO., LTD., NS40-5A) with a die sized at 100 mm×100 mm×3 mm thick under a nitrogen atmosphere at a molding temperature of 215° C. and a die temperature of 70° C.

Yellowness Index (YI)

The yellowness index was measured on a molded body having a thickness of 3 mm using a spectrophotometer (Shimadzu UV-3600) with illuminant C and a 2-degree observer angle in the wavelength range of 380 nm to 780 nm in accordance with the provisions of JIS K 7373 (JIS K 7373:2006). For the production of the molded body, the obtained pellets were dried at 100° C. for 12 hours or more and then injected into an injection molding machine (NISSEI PLASTIC INDUSTRIAL CO., LTD., NS40-5A) with a die sized at 100 mm×100 mm×3 mm thick under a nitrogen atmosphere at a molding temperature of 215° C. and a die temperature of 70° C.

Durability (Heat Resistance at 110° C. and Moisture Heat Resistance at 85° C. and 85% RH)

The obtained pellets were dried at 100° C. for 12 hours or more and then injected into an injection molding machine (NISSEI PLASTIC INDUSTRIAL CO., LTD., NS40-5A) with a die sized at 100 mm×100 mm×3 mm thick at a molding temperature of 215° C. and a die temperature of 70° C. to produce a molded body. The molded body was placed in a thermostatic chamber at 23° C. and 60% RH for 24 hours. After that, the total light transmittance and yellowness index of the molded body were measured. Next, the molded body was kept under predetermined conditions (in a hot air drying oven at 110° C. for 1,000 hours or in a thermo-hygrostat at 85° C. and 85% RH for 1,000 hours), and then transferred out thereof and placed in a thermo-hygrostat at 23° C. and 60% RH for 24 hours. Then, the total light transmittance and yellowness index of the molded body were measured again, and ΔTt (difference in total light transmittance) and ΔYI (difference in YI) were determined. Based on these values, the durability was evaluated according to the following criteria.

Excellent (E): The absolute values of ΔTt and ΔYI are both 0.2 or less.
Good (G): The absolute values of ΔTt and ΔYI are both greater than 0.2 and not more than 0.3.
Fair (F): The absolute value of either ΔTt or ΔYI is greater than 0.3.
Poor (P): The absolute values of ΔTt and ΔYI are both greater than 0.3.

Durability (Heat Resistance at 125° C.)

The obtained pellets were dried at 100° C. for 12 hours or more and then injected into an injection molding machine (NISSEI PLASTIC INDUSTRIAL CO., LTD., NS40-5A) with a die sized at 100 mm×100 mm×3 mm thick at a molding temperature of 215° C. and a die temperature of 80° C. to produce a molded body. The molded body was placed in a thermostatic chamber at 23° C. and 60% RH for 24 hours. After that, the total light transmittance and yellowness index of the molded body were measured. Next, the molded body was kept in a hot air drying oven at 125° C. for 1,000 hours, and then transferred out thereof and placed in a thermo-hygrostat at 23° C. and 60% RH for 24 hours. Then, the total light transmittance and yellowness index of the molded body were measured again, and ΔTt (difference in total light transmittance) and ΔYI (difference in YI) were determined. Based on these values, the durability was evaluated.

Stress Optical Coefficient (Cr)

The stress optical coefficient Cr was evaluated as follows.

The acrylic polymer to be evaluated was melt-pressed into an unstretched film (100 μm thick). The unstretched film was then cut out into a rectangular piece of 60 mm×20 mm, which was used as an evaluation sample. A weight selected to apply a stress of 1 N/mm² or less to the sample was attached to one of the short sides of the sample.

Next, the sample was set in a thermostatic drying oven (DOV-450A, manufactured by AS ONE Corporation) such that the distance between chucks was 40 mm and the attached weight was at the lower end. The thermostatic drying oven was preheated to 3° C. above the Tg of the acrylic polymer (Tg+3° C.) before setting the sample in the oven. After setting the sample, uniaxial stretching of the sample was carried out under the load of the attached weight for about 30 minutes with no change in the set temperature of the thermostatic drying oven. Next, the thermostatic drying oven was cooled at a cooling rate of about 1° C./min until the temperature inside the oven reached 40° C. below the Tg of the acrylic polymer (Tg−40° C.). After cooling, the film was taken out of the drying oven, and the length and thickness of the stretched film, and the weight of the weight were measured, and the in-plane retardation Re of the stretched film was measured with light of wavelength 590 nm by the method shown below.

The same measurement was carried out four times in total for one acrylic polymer using different weights, and the stress optical coefficient Cr of the acrylic polymer was calculated from the results.

The method for calculating Cr was as described in "Frontiers of Transparent Plastics (edited by the Society of Polymer Science, Japan)", pp. 37-44. Specifically, Δn (=nx−ny) of the film was determined from the in-plane retardation Re and thickness of the film after stretching, and the stretching stress σ (unit: N/m²) applied to the film during stretching was determined from the weight of the weight and the length and thickness of the film after stretching. The Δn and σ for each of the four measurements were plotted on the vertical axis and the horizontal axis, respectively. Next, the slope of the approximation straight line connecting the four plotted points was determined by the least-squares method, and this was defined as the Cr of the acrylic polymer.

In-Plane Retardation (Re)

The in-plane retardation Re of the film was measured with light of wavelength 590 nm using the retardation film and material evaluation system RETS-100 (OTSUKA ELECTRONICS CO., LTD.) at an incident angle of 40°. The in-plane retardation Re is given by the following equation: Re=(nx−ny)×d where the refractive index of the film in the slow phase axis direction (the direction of the largest refractive index in the film plane) is nx, the refractive index of the film in the fast axis direction (the direction perpendicular to nx in the film plane) is ny, the refractive index of the film in the thickness direction is nz, and the thickness of the film is d.

Example 1: Production of Acrylic Resin (A1)

A reaction vessel equipped with a stirrer, a temperature sensor, a condenser tube, a nitrogen inlet tube, and a dropping pump was charged with 4 parts by mass of methyl 2-(hydroxymethyl)acrylate (RHMA), 36 parts by mass of methyl methacrylate (MMA), and 96.0 parts by mass of toluene, and the mixture was heated to 105° C. in nitrogen gas flow.

To this, an initiator for initial polymerization, which was a solution composed of 2.85 parts by mass of toluene and 0.245 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.286 part by mass of t-amyl peroxyisononanoate (ARKEMA Yoshitomi, Ltd., LUPEROX (registered trademark) 570), was added dropwise over 170 minutes. In parallel with the initiator addition, a solution composed of 6 parts by mass of methyl 2-(hydroxymethyl)acrylate (RHMA) and 54 parts by mass of methyl methacrylate (MMA) was added dropwise over 180 minutes. In such a manner, solution polymerization was carried out at 105° C. to 110° C., followed by aging for 2 hours.

To the resulting polymerization solution, a solution composed of 1.25 parts by mass of toluene and 0.075 part by mass of stearyl phosphate (SAKAI CHEMICAL INDUS- TRY CO., LTD., Phoslex A-18) was added as a catalyst for cyclocondensation (cyclization catalyst), and cyclocondensation for lactone ring formation was carried out under reflux at about 90° C. to 110° C. for 1.5 hours.

Next, the resulting polymerization solution was passed through a multi-tube heat exchanger kept at 220° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 220° C., and the vacuum pressure was set to 13.3 to 400 hPa (10 to 300 mmHg). During devolatilization, ion-exchanged water was fed to the upstream side of each of the first, second, and third vents at a feeding speed of 1.3 parts by weight per hour.

The resulting resin pellets (A1) had a weight-average molecular weight of 73,000, a molecular weight distribution of 2.0, a glass transition temperature of 121° C., a melt flow rate of 4.9, and a ring structure proportion of 14.3% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 70° C. to produce molded bodies sized at 100 mm×100 mm×3 mm thick.

Example 2: Production of Acrylic Resin (A2)

A reaction vessel equipped with a stirrer, a temperature sensor, a condenser tube, a nitrogen inlet tube, and a dropping pump was charged with 5.2 parts by mass of methyl 2-(hydroxymethyl)acrylate (RHMA), 34.8 parts by mass of methyl methacrylate (MMA), and 96.0 parts by mass of toluene, and the mixture was heated to 105° C. in nitrogen gas flow.

To this, an initiator for initial polymerization, which was a solution composed of 2.85 parts by mass of toluene and 0.22 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.28 part by mass of t-amyl peroxyisononanoate (ARKEMA Yoshitomi, Ltd., LUPEROX (registered trademark) 570), was added dropwise over 170 minutes. In parallel with the initiator addition, a solution composed of 7.8 parts by mass of methyl 2-(hydroxymethyl)acrylate (RHMA) and 52.2 parts by mass of methyl methacrylate (MMA) was added dropwise over 180 minutes. In such a manner, solution polymerization was carried out at 105° C. to 110° C., followed by aging for 2 hours.

To the resulting polymerization solution, a solution composed of 1.25 parts by mass of toluene and 0.075 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 1.5 hours.

Next, the resulting polymerization solution was passed through a multi-tube heat exchanger kept at 220° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 220° C., and the vacuum pressure was set to 13.3 to 400 hPa (10 to 300 mmHg). During devolatilization, ion-exchanged water was fed to the upstream side of each of the first, second, and third vents at a feeding speed of 1.3 parts by weight per hour.

The resulting resin pellets (A2) had a weight-average molecular weight of 71,000, a molecular weight distribution of 2.0, a glass transition temperature of 125° C., a melt flow rate of 5.4, and a ring structure proportion of 18.5% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 70° C. to produce molded bodies sized at 100 mm×100 mm×3 mm thick.

Example 3: Production of Acrylic Resin (A3)

A reaction vessel equipped with a stirrer, a temperature sensor, a condenser tube, a nitrogen inlet tube, and a dropping pump was charged with 6 parts by mass of methyl 2-(hydroxymethyl)acrylate (RHMA), 34 parts by mass of methyl methacrylate (MMA), and 96.0 parts by mass of toluene, and the mixture was heated to 105° C. in nitrogen gas flow.

To this, an initiator for initial polymerization, which was a solution composed of 2.85 parts by mass of toluene and 0.22 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.28 part by mass of t-amyl peroxyisononanoate (ARKEMA Yoshitomi, Ltd., LUPEROX (registered trademark) 570), was added dropwise over 170 minutes. In parallel with the initiator addition, a solution composed of 9 parts by mass of methyl 2-(hydroxymethyl)acrylate (RHMA) and 51 parts by mass of methyl methacrylate (MMA) was added dropwise over 180 minutes. In such a manner, solution polymerization was carried out at 105° C. to 110° C., followed by aging for 2 hours.

To the resulting polymerization solution, a solution composed of 1.25 parts by mass of toluene and 0.085 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 1.5 hours.

Next, the resulting polymerization solution was passed through a multi-tube heat exchanger kept at 230° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 230° C., and the vacuum pressure was set to 13.3 to 400 hPa (10 to 300 mmHg). During devolatilization, ion-exchanged water was fed to the upstream side of each of the first, second, and third vents at a feeding speed of 1.3 parts by weight per hour.

The resulting resin pellets (A3) had a weight-average molecular weight of 69,000, a molecular weight distribution of 2.1, a glass transition temperature of 126° C., a melt flow rate of 6.7, and a ring structure proportion of 21.3% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 70° C. to produce molded bodies sized at 100 mm×100 mm×3 mm thick.

Example 4: Production of Acrylic Resin (A4)

A reaction vessel equipped with a stirrer, a temperature sensor, a condenser tube, a nitrogen inlet tube, and a dropping pump was charged with 10 parts by mass of methyl 2-(hydroxymethyl)acrylate (RHMA), 90 parts by mass of methyl methacrylate (MMA), 114 parts by mass of toluene, 0.03 part by mass of tris (2,4-di-tert-butylphenyl) phosphite, and 0.03 part by mass of n-dodecyl mercaptan as a chain transfer agent, and the mixture was heated to 105° C. in nitrogen gas flow.

To this, an initiator for initial polymerization, which was a solution composed of 1.5 parts by mass of toluene and 0.585 part by mass of t-amyl peroxyisononanoate (ARKEMA Yoshitomi, Ltd., LUPEROX (registered trademark) 570) was added, and solution polymerization was carried out at 105° C. to 110° C. for 5 hours.

To the resulting polymerization solution, a solution composed of 1.0 part by mass of toluene and 0.075 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 1.5 hours.

Next, the resulting polymerization solution was passed through a multi-tube heat exchanger kept at 220° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 220° C., and the vacuum pressure was set to 13.3 to 400 hPa (10 to 300 mmHg). During devolatilization, ion-exchanged water was fed to the upstream side of each of the first and third vents at a feeding speed of 1.3 parts by weight per hour, and a solution composed of 0.58 part by mass of toluene and 0.02 part by mass of 2,2'-methylenebis(6-(2H-benzotriazol-2-yl)-4-(1,1,3,3-tetra methylbutyl)phenol) (ADEKA Corporation, ADK STAB (registered trademark) LA-31) was fed as a ultraviolet absorber at a feeding speed of 0.6 part by mass per hour.

The resulting resin pellets (A4) had a weight-average molecular weight of 88,000, a molecular weight distribution of 2.3, a glass transition temperature of 122° C., a melt flow rate of 3.5, and a ring structure proportion of 14.3% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 70° C. to produce molded bodies sized at 100 mm×100 mm×3 mm thick.

Example 5: Production of Acrylic Resin (A5)

A reaction vessel equipped with a stirrer, a temperature sensor, a condenser tube, a nitrogen inlet tube, and a dropping pump was charged with 10 parts by mass of methyl 2-(hydroxymethyl)acrylate (RHMA), 90 parts by mass of methyl methacrylate (MMA), 114 parts by mass of toluene, 0.07 part by mass of tris (2,4-di-tert-butylphenyl) phosphite, and 0.07 part by mass of n-dodecyl mercaptan as a chain transfer agent, and the mixture was heated to 105° C. in nitrogen gas flow.

To this, an initiator for initial polymerization, which was a solution composed of 1.5 parts by mass of toluene and 0.585 part by mass of t-amyl peroxyisononanoate (ARKEMA Yoshitomi, Ltd., LUPEROX (registered trademark) 570) was added, and solution polymerization was carried out at 105° C. to 110° C. for 5 hours.

To the resulting polymerization solution, a solution composed of 1.0 part by mass of toluene and 0.075 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 1.5 hours.

Next, the resulting polymerization solution was passed through a multi-tube heat exchanger kept at 230° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 230° C., and the vacuum pressure was set to 13.3 to 400 hPa (10 to 300 mmHg). During devolatilization, ion-exchanged water was fed to the upstream side of each of the first, second, and third vents at a feeding speed of 1.3 parts by weight per hour.

The resulting resin pellets (A5) had a weight-average molecular weight of 92,000, a molecular weight distribution of 2.3, a glass transition temperature of 122° C., a melt flow rate of 2.2, and a ring structure proportion of 14.3% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 70° C. to produce molded bodies sized at 100 mm×100 mm×3 mm thick.

Example 6: Production of Acrylic Resin (A6)

A reaction vessel equipped with a stirrer, a temperature sensor, a condenser tube, a nitrogen inlet tube, and a dropping pump was charged with 9 parts by mass of methyl 2-(hydroxymethyl)acrylate, 91 parts by mass of methyl methacrylate, 107.8 parts by mass of toluene, 0.25 part by mass of tris(2,4-di-tert-butylphenyl) phosphite, and 0.17 part by mass of n-dodecyl mercaptan as a chain transfer agent, and the mixture was heated to 105° C. in nitrogen gas flow.

To this, 0.367 part by mass of t-amyl peroxyisononanoate (ARKEMA Yoshitomi, Ltd., LUPEROX (registered trademark) 570) was added as an initiator for initial polymerization. After 5 minutes, an initiator for subsequent polymerization, which was a solution composed of 8.14 parts by mass of toluene and 0.193 part by mass of t-amyl peroxyisononanoate (ARKEMA Yoshitomi, Ltd., LUPEROX (registered trademark) 570), was added dropwise over 2 hours. In such a manner, solution polymerization was carried out at 100° C. to 110° C., followed by aging for 4 hours.

To the resulting polymerization solution, 0.075 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 1.5 hours.

Next, the resulting polymerization solution was passed through a multi-tube heat exchanger kept at 210° C. to complete the cyclocondensation. The polymerization solution was then fed into a vented twin-screw extruder (L/D=52) equipped with a leaf-disc filter for polymer filtration (filtration precision: 5 µm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 210° C., and the vacuum pressure was set to 13.3 to 400 hPa (10 to 300 mmHg). During devolatilization, ion-exchanged water was fed to the upstream side of each of the first and second vents at a feeding speed of 1.3 parts by weight per hour, and a separately prepared antioxidant solution was fed to the upstream side of the third vent at a feeding speed of 0.6 part by weight per hour. The antioxidant solution used was prepared by dissolving 1.0 part by weight of two antioxidants (BASF Japan Ltd., Irganox 1010, and ADEKA Corporation, ADK STAB AO-412S) in 30.4 parts by weight of toluene.

The resulting resin pellets (A6) had a weight-average molecular weight of 70,000, a molecular weight distribution of 2.3, a glass transition temperature of 121° C., a melt flow rate of 5.4, and a ring structure proportion of 13.0% by mass. The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 70° C. to produce molded bodies sized at 100 mm×100 mm×3 mm thick.

Reference Example 1: Production of Acrylic Resin (A7)

A reaction vessel equipped with a stirrer, a temperature sensor, a condenser tube, a nitrogen inlet tube, and a dropping pump was charged with 12 parts by mass of methyl 2-(hydroxymethyl)acrylate, 83.5 parts by mass of methyl methacrylate, 90.4 parts by mass of toluene, 0.05 part by mass of tris(2,4-di-tert-butylphenyl) phosphite, and 0.07 part by mass of n-dodecyl mercaptan as a chain transfer agent, and the mixture was heated to 105° C. in nitrogen gas flow.

To this, 0.09 part by mass of t-amyl peroxyisononanoate (ARKEMA Yoshitomi, Ltd., LUPEROX (registered trademark) 570) was added as an initiator for initial polymerization. After 5 minutes, a solution composed of 4.5 parts by mass of styrene, 8.14 parts by mass of toluene, and 0.179 part by mass of t-amyl peroxyisononanoate (ARKEMA Yoshitomi, Ltd., LUPEROX (registered trademark) 570) as an initiator for subsequent polymerization was added dropwise over 2 hours. In such a manner, solution polymerization was carried out at 100° C. to 110° C., followed by aging for 4 hours.

To the resulting polymerization solution, 0.075 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 1.5 hours.

Next, the resulting polymerization solution was passed through a multi-tube heat exchanger kept at 240° C. to complete the cyclocondensation. The polymerization solution was then fed into a vented twin-screw extruder (L/D=52) equipped with a leaf-disc filter for polymer filtration (filtration precision: 5 µm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 240° C., and the vacuum pressure was set to 13.3 to 400 hPa (10 to 300 mmHg). During devolatilization, ion-exchanged water was fed to the upstream side of each of the first and second vents at a feeding speed of 1.3 parts by weight per hour, and a separately prepared solution of a cyclization catalyst deactivator was fed to the upstream side of the third vent at a feeding speed of 0.3 part by weight per hour. The cyclization catalyst deactivator solution used was prepared by dissolving 1.0 part by weight of zinc octylate (NIHON KAGAKU SANGYO CO., LTD., trade name: Nikka Octhix Zinc, 10% by weight) in 0.3 part by weight of toluene.

The resulting resin pellets (A7) had a weight-average molecular weight of 102,000, a molecular weight distribution of 2.4, a glass transition temperature of 123° C., a melt flow rate of 0.8, and a ring structure proportion of 16.9% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 70° C. However, burning was caused, and assessable molded bodies were failed to be produced.

Comparative Example 1

A commercially available methyl methacrylate/methyl acrylate copolymer (SUMITOMO CHEMICAL COMPANY, LIMITED, SUMIPEX MH, a weight average molecular weight of 93,000, a molecular weight distribution of 2.0, a glass transition temperature of 110° C., a melt flow rate of 2.0) was dried at 90° C. for 12 hours or more and then injected into an injection molding machine (NISSEI PLASTIC INDUSTRIAL CO., LTD., NS40-5A) at a molding temperature of 215° C. and a die temperature of 70° C. to produce molded bodies sized at 100 mm×100 mm×3 mm thick.

Comparative Example 2

A commercially available methyl methacrylate/methacrylic acid copolymer (Arkema Inc., ALTUGLAS HT121, a weight average molecular weight of 74,000, a molecular weight distribution of 1.9, a glass transition temperature of 121° C., a melt flow rate of 2.5) was dried at 100° C. for 12 hours or more and then injected into an injection molding machine (NISSEI PLASTIC INDUSTRIAL CO., LTD., NS40-5A) at a molding temperature of 215° C. and a die temperature of 70° C. to produce molded bodies sized at 100 mm×100 mm×3 mm thick.

The evaluation results of the Examples, Reference Example and Comparative Examples are shown in Table 1.

composed of 12 parts by mass of methyl 2-(hydroxymethyl) acrylate (RHMA) and 48 parts by mass of methyl methacrylate (MMA) was added dropwise over 180 minutes. In such a manner, solution polymerization was carried out at 105° C. to 110° C., followed by aging for 2 hours.

TABLE 1

|  |  | Example 1 | Example 2 | Example 3 | Example 4 | Example 5 | Example 6 | Reference Example 1 | Comparative Example 1 | Comparative Example 2 |
|---|---|---|---|---|---|---|---|---|---|---|
| Input materials (weight ratio) | RHMA | 10 | 13 | 15 | 10 | 10 | 9 | 12 | SUMIPEX MH (MMA/MA copolymer) | ALTUGLAS HT121 (MMA/MAA copolymer) |
|  | MMA | 90 | 87 | 85 | 90 | 90 | 91 | 83.5 |  |  |
|  | St | — | — | — | — | — | — | — |  |  |
| Amount of chain transfer agent (ppm) |  | — | — | — | 300 | 700 | 1700 | 700 |  |  |
| Amount of UV absorber (ppm) |  | — | — | — | 250 | — | — | — |  |  |
| Mw (×10$^4$) |  | 7.3 | 7.1 | 6.9 | 8.8 | 9.2 | 7.0 | 10.2 | 9.3 | 7.4 |
| Mw/Mn |  | 2.0 | 2.0 | 2.1 | 2.3 | 2.3 | 2.3 | 2.4 | 2 | 1.9 |
| Tg (° C.) |  | 121 | 125 | 126 | 122 | 122 | 121 | 123 | 110 | 121 |
| MFR (g/10 min) |  | 4.9 | 5.4 | 6.7 | 3.5 | 2.2 | 5.4 | 0.8 | 2.0 | 2.5 |
| Total light transmittance (%) |  | 92.4 | 92.4 | 92.4 | 92.4 | 92.4 | 92.4 | Molding defects (burns) | 92.5 | 92.2 |
| YI |  | 0.9 | 0.9 | 1.0 | 0.9 | 1.3 | 1.6 |  | 0.7 | 1.4 |
| Durability | 110° C. 1000HR | E | E | E | E | E | G |  | P | F |
|  | 85° C.85% RH 1000HR | E | E | E | E | E | E |  | G | P |

As is clear from the above Table, the acrylic polymers obtained in the Examples had excellent melt flowability.

In addition, the acrylic polymers in the Examples were able to produce injection molded bodies. Such molded bodies had a low yellowness index.

The acrylic polymers in the Examples had excellent resistance to moisture heat and exhibited less reduction in light transmittance and less yellowing, even after being exposed to high-temperature environment or high-temperature and high-humidity environment for a period of time.

These acrylic polymers are materials having excellent flowability (and even excellent resistance to moisture heat) and are suitable for applications that require these properties (such as light guides).

The acrylic polymers in the Examples had the Tg comparable to that of the polymer in Comparative Example 2, but had superior durability compared to that of the polymer in Comparative Example 2.

Example 7: Production of Acrylic Resin (A8)

A reaction vessel equipped with a stirrer, a temperature sensor, a condenser tube, a nitrogen inlet tube, and a dropping pump was charged with 8 parts by mass of methyl 2-(hydroxymethyl)acrylate (RHMA), 32 parts by mass of methyl methacrylate (MMA), 96.0 parts by mass of toluene, and 0.10 part by mass of tris(2,4-di-tert-butylphenyl) phosphite, and the mixture was heated to 105° C. in nitrogen gas flow.

To this, an initiator for initial polymerization, which was a solution composed of 2.85 parts by mass of toluene and 0.22 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.28 part by mass of t-amyl peroxyisononanoate (ARKEMA Yoshitomi, Ltd., LUPEROX (registered trademark) 570), was added dropwise over 170 minutes. In parallel with the initiator addition, a solution To the resulting polymerization solution, a solution composed of 1.25 parts by mass of toluene and 0.10 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 2 hours.

Next, the resulting polymerization solution was passed through a multi-tube heat exchanger kept at 240° C. to complete the cyclocondensation. The polymerization solution was then fed into a vented twin-screw extruder (L/D=52) equipped with a leaf-disc filter for polymer filtration (filtration precision: 5 µm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 240° C., and the vacuum pressure was set to 13.3 to 400 hPa (10 to 300 mmHg). During devolatilization, ion-exchanged water was fed to the upstream side of each of the first and third vents at a feeding speed of 1.3 parts by weight per hour, and a separately prepared mixed solution of a bluing agent and antioxidants was fed to the upstream side of the second vent at a feeding speed of 0.30 part by weight per hour. The mixed solution of a bluing agent and antioxidants used was composed of 0.18 part by weight of a solution prepared by dissolving 1.0 part by weight of a bluing agent (Sumika Chemtex Company, Limited, Sumiplast (registered trademark) Violet B) in 99 parts by weight of toluene, 3.6 parts by weight of two antioxidants (BASF Japan Ltd., Irganox 1010, and ADEKA Corporation, ADK STAB AO-412S), and 112.5 parts by weight of toluene.

The resulting resin pellets (A8) had a weight-average molecular weight of 74,000, a molecular weight distribution of 2.3, a glass transition temperature of 129° C., a melt flow rate of 5.9, and a ring structure proportion of 28.8% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 80° C. to produce molded bodies sized at 100 mm×100 mm×3 mm thick.

Example 8: Production of Acrylic Resin (A9)

A reaction vessel equipped with a stirrer, a temperature sensor, a condenser tube, a nitrogen inlet tube, and a dropping pump was charged with 10.4 parts by mass of methyl 2-(hydroxymethyl)acrylate (RHMA), 34.7 parts by mass of methyl methacrylate (MMA), 96.0 parts by mass of toluene, and 0.10 part by mass of tris(2,4-di-tert-butylphenyl) phosphite, and the mixture was heated to 105° C. in nitrogen gas flow.

To this, an initiator for initial polymerization, which was a solution composed of 2.85 parts by mass of toluene and 0.29 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.30 part by mass of t-amyl peroxyisononanoate (ARKEMA Yoshitomi, Ltd., LUPEROX (registered trademark) 570), was added dropwise over 170 minutes. In parallel with the initiator addition, a solution composed of 12.6 parts by mass of methyl 2-(hydroxymethyl)acrylate (RHMA) and 42.3 parts by mass of methyl methacrylate (MMA) was added dropwise over 180 minutes. In such a manner, solution polymerization was carried out at 105° C. to 110° C., followed by aging for 2 hours.

To the resulting polymerization solution, a solution composed of 1.25 parts by mass of toluene and 0.30 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 2 hours.

Next, the resulting polymerization solution was passed through a multi-tube heat exchanger kept at 240° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 240° C., and the vacuum pressure was set to 13.3 to 400 hPa (10 to 300 mmHg). During devolatilization, ion-exchanged water was fed to the upstream side of each of the first and third vents at a feeding speed of 1.3 parts by weight per hour, and a separately prepared mixed solution of a bluing agent and antioxidants was fed to the upstream side of the second vent at a feeding speed of 0.30 part by weight per hour. The mixed solution of a bluing agent and antioxidants used was composed of 0.27 part by weight of a solution prepared by dissolving 1.0 part by weight of a bluing agent (Sumika Chemtex Company, Limited, Sumiplast (registered trademark) Violet B) in 99 parts by weight of toluene, 3.6 parts by weight of two antioxidants (BASF Japan Ltd., Irganox 1010, and ADEKA Corporation, ADK STAB AO-412S), and 112.5 parts by weight of toluene.

The resulting resin pellets (A9) had a weight-average molecular weight of 80,000, a molecular weight distribution of 2.1, a glass transition temperature of 132° C., a melt flow rate of 4.0, and a ring structure proportion of 33.0% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 80° C. to produce molded bodies sized at 100 mm×100 mm×3 mm thick.

Example 9: Production of Acrylic Resin (A10)

A reaction vessel equipped with a stirrer, a temperature sensor, a condenser tube, a nitrogen inlet tube, and a dropping pump was charged with 12.6 parts by mass of methyl 2-(hydroxymethyl)acrylate (RHMA), 32.4 parts by mass of methyl methacrylate (MMA), 96.0 parts by mass of toluene, and 0.10 part by mass of tris (2,4-di-tert-butylphenyl) phosphite, and the mixture was heated to 105° C. in nitrogen gas flow. To this, an initiator for initial polymerization, which was a solution composed of 2.85 parts by mass of toluene and 0.24 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.27 part by mass of t-amyl peroxyisononanoate (ARKEMA Yoshitomi, Ltd., LUPEROX (registered trademark) 570), was added dropwise over 170 minutes. In parallel with the initiator addition, a solution composed of 15.4 parts by mass of methyl 2-(hydroxymethyl)acrylate (RHMA) and 39.6 parts by mass of methyl methacrylate (MMA) was added dropwise over 180 minutes. In such a manner, solution polymerization was carried out at 105° C. to 110° C., followed by aging for 2 hours.

To the resulting polymerization solution, a solution composed of 1.25 parts by mass of toluene and 0.075 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 2 hours.

Next, the resulting polymerization solution was passed through a multi-tube heat exchanger kept at 240° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 240° C., and the vacuum pressure was set to 13.3 to 400 hPa (10 to 300 mmHg). During devolatilization, ion-exchanged water was fed to the upstream side of each of the first and third vents at a feeding speed of 1.3 parts by weight per hour, and a separately prepared mixed solution of a bluing agent and antioxidants was fed to the upstream side of the second vent at a feeding speed of 0.30 part by weight per hour. The mixed solution of a bluing agent and antioxidants used was composed of 0.54 part by weight of a solution prepared by dissolving 1.0 part by weight of a bluing agent (Sumika Chemtex Company, Limited, Sumiplast (registered trademark) Violet B) in 99 parts by weight of toluene, 3.6 parts by weight of two antioxidants (BASF Japan Ltd., Irganox 1010, and ADEKA Corporation, ADK STAB AO-412S), and 112.5 parts by weight of toluene.

The resulting resin pellets (A10) had a weight-average molecular weight of 66,000, a molecular weight distribution of 2.2, a glass transition temperature of 136° C., a melt flow rate of 5.6, and a ring structure proportion of 39.8% by mass. The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 80° C. to produce molded bodies sized at 100 mm×100 mm×3 mm thick.

Example 10: Production of Acrylic Resin (A11)

A reaction vessel equipped with a stirrer, a temperature sensor, a condenser tube, a nitrogen inlet tube, and a dropping pump was charged with 10.4 parts by mass of methyl 2-(hydroxymethyl)acrylate (RHMA), 34.7 parts by mass of methyl methacrylate (MMA), 96.0 parts by mass of toluene, and 0.10 part by mass of tris (2,4-di-tert-butylphenyl) phosphite, and the mixture was heated to 105° C. in nitrogen gas flow.

To this, an initiator for initial polymerization, which was a solution composed of 2.85 parts by mass of toluene and 0.29 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.30 part by mass of t-amyl peroxyisononanoate (ARKEMA Yoshitomi, Ltd., LUPEROX (registered trademark) 570), was added dropwise over 170 minutes. In parallel with the initiator addition, a solution composed of 12.6 parts by mass of methyl 2-(hydroxymethyl)acrylate (RHMA) and 42.3 parts by mass of methyl methacrylate (MMA) was added dropwise over 180 minutes. In such a manner, solution polymerization was carried out at 105° C. to 110° C., followed by aging for 2 hours.

To the resulting polymerization solution, a solution composed of 1.25 parts by mass of toluene and 0.30 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 2 hours.

Next, the resulting polymerization solution was passed through a multi-tube heat exchanger kept at 240° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 240° C., and the vacuum pressure was set to 13.3 to 400 hPa (10 to 300 mmHg). During devolatilization, ion-exchanged water was fed to the upstream side of each of the first and third vents at a feeding speed of 1.3 parts by weight per hour, and a separately prepared mixed solution of a bluing agent and antioxidants was fed to the upstream side of the second vent at a feeding speed of 0.30 part by weight per hour. The mixed solution of a bluing agent and antioxidants used was composed of 0.36 part by weight of a solution prepared by dissolving 1.0 part by weight of a bluing agent (Sumika Chemtex Company, Limited, Sumiplast (registered trademark) Violet B) in 99 parts by weight of toluene, 3.6 parts by weight of two antioxidants (BASF Japan Ltd., Irganox 1010, and ADEKA Corporation, ADK STAB AO-412S), and 112.5 parts by weight of toluene.

The resulting resin pellets (A11) had a weight-average molecular weight of 77,000, a molecular weight distribution of 2.1, a glass transition temperature of 132° C., a melt flow rate of 4.0, and a ring structure proportion of 33.0% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 80° C. to produce molded bodies sized at 100 mm×100 mm×3 mm thick.

Example 11: Production of Acrylic Resin (A12)

A reaction vessel equipped with a stirrer, a temperature sensor, a condenser tube, a nitrogen inlet tube, and a dropping pump was charged with 10.4 parts by mass of methyl 2-(hydroxymethyl)acrylate (RHMA), 34.7 parts by mass of methyl methacrylate (MMA), 96.0 parts by mass of toluene, and 0.10 part by mass of tris(2,4-di-tert-butylphenyl) phosphite, and the mixture was heated to 105° C. in nitrogen gas flow.

To this, an initiator for initial polymerization, which was a solution composed of 2.85 parts by mass of toluene and 0.23 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.27 part by mass of t-amyl peroxyisononanoate (ARKEMA Yoshitomi, Ltd., LUPEROX (registered trademark) 570), was added dropwise over 170 minutes. In parallel with the initiator addition, a solution composed of 12.6 parts by mass of methyl 2-(hydroxymethyl)acrylate (RHMA) and 42.3 parts by mass of methyl methacrylate (MMA) was added dropwise over 180 minutes. In such a manner, solution polymerization was carried out at 105° C. to 110° C., followed by aging for 2 hours.

To the resulting polymerization solution, a solution composed of 1.25 parts by mass of toluene and 0.30 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 2 hours.

Next, the resulting polymerization solution was passed through a multi-tube heat exchanger kept at 240° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 240° C., and the vacuum pressure was set to 13.3 to 400 hPa (10 to 300 mmHg). During devolatilization, ion-exchanged water was fed to the upstream side of each of the first and third vents at a feeding speed of 1.3 parts by weight per hour, and a separately prepared mixed solution of a bluing agent and antioxidants was fed to the upstream side of the second vent at a feeding speed of 0.30 part by weight per hour. The mixed solution of a bluing agent and antioxidants used was composed of 0.72 part by weight of a solution prepared by dissolving 1.0 part by weight of a bluing agent (Sumika Chemtex Company, Limited, Sumiplast (registered trademark) Violet B) in 99 parts by weight of toluene, 3.6 parts by weight of two antioxidants (BASF Japan Ltd., Irganox 1010, and ADEKA Corporation, ADK STAB AO-412S), and 112.5 parts by weight of toluene.

The resulting resin pellets (A12) had a weight-average molecular weight of 91,000, a molecular weight distribution of 2.2, a glass transition temperature of 132° C., a melt flow rate of 2.5, and a ring structure proportion of 32.8% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 80° C. to produce molded bodies sized at 100 mm×100 mm×3 mm thick.

Example 12: Production of Acrylic Resin (A13)

The same procedure as in Example 11 was carried out except that no bluing agent was used to produce resin pellets.

The resulting resin pellets (A13) had a weight average molecular weight of 90,000, a molecular weight distribution of 2.2, a glass transition temperature of 132° C., a melt flow rate of 2.4, and a ring structure proportion of 32.8% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 80° C. to produce molded bodies sized at 100 mm×100 mm×3 mm thick.

Example 13: Production of Acrylic Resin (A14)

A reaction vessel equipped with a stirrer, a temperature sensor, a condenser tube, a nitrogen inlet tube, and a dropping pump was charged with 10.4 parts by mass of methyl 2-(hydroxymethyl)acrylate (RHMA), 34.7 parts by mass of methyl methacrylate (MMA), 96.0 parts by mass of toluene, and 0.10 part by mass of tris(2,4-di-tert-butylphenyl) phosphite, and the mixture was heated to 105° C. in nitrogen gas flow.

To this, an initiator for initial polymerization, which was a solution composed of 2.85 parts by mass of toluene and 0.22 part by mass of t-amyl peroxyisononanoate (ARKEMA Yoshitomi, Ltd., LUPEROX (registered trademark) 570), was added dropwise over 8 minutes. In such a manner, solution polymerization was carried out at 105° C. to 110° C. After 12 minutes, an initiator for subsequent polymerization, which was a solution composed of 3.32 parts by mass of toluene and 0.25 part by mass of t-amyl peroxyisononanoate (ARKEMA Yoshitomi, Ltd., LUPEROX (registered trademark) 570), was added dropwise over 170 minutes. In parallel with the initiator addition, a solution composed of 12.6 parts by mass of methyl 2-(hydroxymethyl)acrylate (RHMA) and 42.3 parts by mass of methyl methacrylate (MMA) was added dropwise over 180 minutes. In such a manner, solution polymerization was carried out at 105° C. to 110° C., followed by aging for 2 hours.

To the resulting polymerization solution, a solution composed of 1.25 parts by mass of toluene and 0.30 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 2 hours.

Next, the resulting polymerization solution was passed through a multi-tube heat exchanger kept at 240° C. to complete the cyclocondensation. The polymerization solution was then fed into a vented twin-screw extruder (L/D=52) equipped with a leaf-disc filter for polymer filtration (filtration precision: 5 µm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 240° C., and the vacuum pressure was set to 13.3 to 400 hPa (10 to 300 mmHg). During devolatilization, ion-exchanged water was fed to the upstream side of each of the first and third vents at a feeding speed of 1.3 parts by weight per hour, and a separately prepared mixed solution of a bluing agent and antioxidants was fed to the upstream side of the second vent at a feeding speed of 0.30 part by weight per hour. The mixed solution of a bluing agent and antioxidants used was composed of 1.8 parts by weight of a solution prepared by dissolving 1.0 part by weight of a bluing agent (Sumika Chemtex Company, Limited, Sumiplast (registered trademark) Violet B) in 99 parts by weight of toluene, 3.6 parts by weight of two antioxidants (BASF Japan Ltd., Irganox 1010, and ADEKA Corporation, ADK STAB AO-412S), and 112.5 parts by weight of toluene.

The resulting resin pellets (A14) had a weight-average molecular weight of 84,000, a molecular weight distribution of 2.2, a glass transition temperature of 132° C., a melt flow rate of 3.5, and a ring structure proportion of 32.8% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 80° C. to produce molded bodies sized at 100 mm×100 mm×3 mm thick.

The evaluation results of Examples 7 to 13 are shown in Table 2.

TABLE 2

| | | Example 7 | Example 8 | Example 9 | Example 10 | Example 11 | Example 12 | Example 13 |
|---|---|---|---|---|---|---|---|---|
| Input materials (weight ratio) | RHMA | 20 | 23 | 28 | 23 | 23 | 23 | 23 |
| | MMA | 80 | 77 | 72 | 77 | 77 | 77 | 77 |
| | St | — | — | — | — | — | — | — |
| Amount of blueing agent (ppb) | | 50 | 75 | 150 | 100 | 200 | — | 500 |
| Proportion of ring structure (% by mass) | | 28.8 | 33.0 | 39.8 | 33.0 | 32.8 | 32.8 | 32.8 |
| Mw (×$10^4$) | | 7.4 | 8 | 6.6 | 7.7 | 9.1 | 9 | 8.4 |
| Mw/Mn | | 2.3 | 2.1 | 2.2 | 2.1 | 2.2 | 2.2 | 2.2 |
| Tg (° C.) | | 129 | 132 | 136 | 132 | 132 | 132 | 132 |

TABLE 2-continued

|  |  | Example 7 | Example 8 | Example 9 | Example 10 | Example 11 | Example 12 | Example 13 |
|---|---|---|---|---|---|---|---|---|
| MFR (g/10 min) | | 5.9 | 4 | 5.6 | 4 | 2.5 | 2.4 | 3.5 |
| Total light transmittance: Tt (%) | | 92.4 | 92.3 | 92.1 | 92.2 | 92.1 | 92.4 | 91.7 |
| Yellowness index: YI | | 0.4 | 0.4 | 0.5 | 0.3 | 0.2 | 0.7 | 0.3 |
| Durability | 125° C. 1000HR ΔYI | 0.1 | 0.1 | 0.1 | 0.2 | 0.4 | 0.1 | 1.1 |
|  | 125° C. 1000HR ΔTt | −0.2 | −0.1 | 0 | −0.1 | −0.1 | −0.1 | −0.2 |

As is clear from the results in the above Table 2, even when the proportion of the ring structure (lactone ring structure) was increased, the obtained acrylic polymers had excellent melt flowability.

The obtained polymers generally showed the same tendency as those in the foregoing Examples. In particular, they had a low yellowness index and excellent durability, and this tendency was particularly pronounced when bluing agents were used.

Example 14: Production of Acrylic Polymer (A15)

A reaction vessel equipped with a stirrer, a temperature sensor, a condenser tube, a nitrogen inlet tube, and a dropping pump was charged with 5.40 parts by mass of methyl 2-(hydroxymethyl)acrylate (RHMA), 37.6 parts by mass of methyl methacrylate (MMA), 0.450 part by mass of styrene (St), and 90.0 parts by mass of toluene, and the mixture was heated to 105° C. in nitrogen gas flow.

To this, an initiator for initial polymerization, which was a solution composed of 3.63 parts by mass of toluene and 0.245 part by mass of t-amyl peroxyisononanoate (ARKEMA Yoshitomi, Ltd., LUPEROX (registered trademark) 570), was added dropwise over 9 minutes. In such a manner, solution polymerization was carried out at 105° C. to 110° C. After 11 minutes, an initiator for subsequent polymerization, which was a solution composed of 4.42 parts by mass of toluene and 0.298 part by mass of t-amyl peroxyisononanoate (ARKEMA Yoshitomi, Ltd., LUPEROX (registered trademark) 570), was added dropwise over 180 minutes. In parallel with the initiator addition, a solution composed of 6.6 parts by mass of methyl 2-(hydroxymethyl)acrylate (RHMA), 45.9 parts by mass of methyl methacrylate (MMA), and 4.05 parts by mass of styrene (St) was added dropwise over 180 minutes. In such a manner, solution polymerization was carried out at 105° C. to 110° C., followed by aging for 100 minutes.

To the resulting polymerization solution, a solution composed of 1.20 parts by mass of toluene and 0.0750 part by mass of stearyl phosphate (SAKAI CHEMICAL INDUSTRY CO., LTD., Phoslex A-18) was added as a catalyst for cyclocondensation (cyclization catalyst), and cyclocondensation for lactone ring formation was carried out under reflux at about 90° C. to 110° C. for 1.5 hours.

Next, the resulting polymerization solution was passed through a multi-tube heat exchanger kept at 220° C. to complete the cyclocondensation. The polymerization solution was then fed into a vented twin-screw extruder (L/D=52) equipped with a leaf-disc filter for polymer filtration (filtration precision: 5 μm) at the downstream end of the extruder and devolatilized at a processing rate of 90 parts by weight per hour in terms of resin content. The vented screw extruder used had one rear vent and four fore vents (denoted as the first, second, third, and fourth vents from the upstream side). The extruder barrel temperature was set to 220° C., and the vacuum pressure was set to 13.3 to 400 hPa (10 to 300 mmHg). During devolatilization, ion-exchanged water was fed to the upstream side of each of the first, second, and third vents at a feeding speed of 1.3 parts by weight per hour.

The resulting resin pellets (A15) had a weight-average molecular weight of 87,000, a molecular weight distribution of 2.3, a glass transition temperature of 123° C., a melt flow rate of 6.6, and a ring structure proportion of 16.9% by mass.

The resulting pellets were dried at 100° C. for 12 hours or more and then injected into an injection molding machine (NISSEI PLASTIC INDUSTRIAL CO., LTD., NS40-5A) at a molding temperature of 215° C. and a die temperature of 80° C. to produce molded bodies sized at 100 mm×100 mm×3 mm thick.

The evaluation results of Example 14 are shown in Table 3.

TABLE 3

|  |  | Example 14 |
|---|---|---|
| Input materials (weight ratio) | RHMA | 12 |
|  | MMA | 83.5 |
|  | St | 4.5 |
| Mw (×10$^4$) | | 8.7 |
| Mw/Mn | | 2.3 |
| Tg (° C.) | | 123 |
| MFR (g/10 min) | | 6.6 |
| Cr (10$^{-11}$Pa$^{-1}$) | | −1.7 |
| Total light transmittance: Tt (%) | | 92 |
| Yellowness index: YI | | 0.5 |

INDUSTRIAL APPLICABILITY

The present invention provides a novel acrylic polymer.

The invention claimed is:

1. A composition comprising a resin (A), wherein the resin (A) consists of an acrylic polymer having a lactone ring structure in a main chain of the acrylic polymer, the acrylic polymer having a melt flow rate of 2 g/10 minutes or more as measured at 230° C. under a load of 3.8 kg according to JIS K 7210,
    wherein the acrylic polymer has a yellowness index of 2 or less, and
    the lactone ring structure comprises a 6-membered ring.

2. The composition according to claim 1, wherein the acrylic polymer has a glass transition temperature of 110° C. or higher.

3. The composition according to claim 1, wherein the acrylic polymer has a total light transmittance of 92% or more.

4. The composition according to claim 1, wherein the acrylic polymer has a molecular weight distribution (Mw/Mn) of 2.2 or less.

5. A molded body comprising the composition according to claim 1.

6. The molded body according to claim 5, wherein the molded body is a light guiding member or a lens member.

7. The molded body according to claim 5, wherein the molded body is a light guide for a vehicle lamp, a lens member of a head-up display, or a lens member of an in-vehicle camera.

8. The composition according to claim 1, wherein the acrylic polymer has the melt flow rate of 2.2 g/10 minutes or more as measured at 230° C. under a load of 3.8 kg according to JIS K 7210.

9. The composition according to claim 1, wherein the acrylic polymer has the melt flow rate of 3.5 g/10 minutes or more as measured at 230° C. under a load of 3.8 kg according to JIS K 7210.

10. The composition according to claim 1, wherein the acrylic polymer has the yellowness index of 1.7 or less.

11. The composition according to claim 1, wherein a proportion of the lactone ring structure in the acrylic polymer is 0.1% mass or more and 90% by mass or less.

12. The composition according to claim 1, wherein a proportion of the lactone ring structure in the acrylic polymer is 10% mass or more and 80% by mass or less.

13. The composition according to claim 1, wherein the weight average molecular weight of 70,000 to 95,000.

14. The composition according to claim 1, wherein the melt flow rate of 10 g/10 minutes or less as measured at 230° C. under a load of 3.8 kg according to JIS K 7210.

15. The composition according to claim 1, wherein the only resin in the composition is the acrylic polymer having a lactone ring structure in a main chain of the acrylic polymer.

16. The composition according to claim 1, wherein the composition excludes a graft copolymer.

17. The composition according to claim 1, wherein the lactone ring structure is the structure represented by the following formula (1),

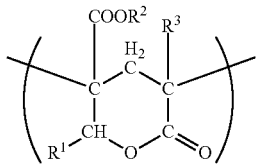

wherein in formula (1), $R^1$, $R^2$, and $R^3$ are each independently a hydrogen atom or a substituent.

* * * * *